United States Patent
Chen Larsson et al.

(10) Patent No.: US 12,520,251 B1
(45) Date of Patent: Jan. 6, 2026

(54) APPLYING POWER MANAGEMENT FOR PHYSICAL RANDOM ACCESS CHANNEL (PRACH)

(71) Applicant: TELEFONAKTIEBOLAGET LM ERICSSON (PUBL), Stockholm (SE)

(72) Inventors: Maomao Chen Larsson, Lund (SE); Christian Bergljung, Lund (SE); Robert Mark Harrison, Plano, TX (US); Chunhui Zhang, Stockholm (SE); Ling Su, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 19/237,661

(22) Filed: Jun. 13, 2025

Related U.S. Application Data

(63) Continuation of application No. PCT/CN2024/132494, filed on Nov. 15, 2024.

(51) Int. Cl.
*H04W 52/36* (2009.01)
*H04W 74/0833* (2024.01)

(52) U.S. Cl.
CPC ....... *H04W 52/367* (2013.01); *H04W 52/365* (2013.01); *H04W 74/0833* (2013.01)

(58) Field of Classification Search
CPC ............. H04W 52/367; H04W 52/365; H04W 74/0833; H04W 52/36
See application file for complete search history.

(56) References Cited

U.S. PATENT DOCUMENTS

| | | | |
|---|---|---|---|
| 2019/0028980 A1* | 1/2019 | Feuersaenger | ...... H04W 52/327 |
| 2022/0191940 A1* | 6/2022 | MolavianJazi | ... H04W 74/0833 |
| 2023/0121938 A1* | 4/2023 | Zhou | .................. H04B 7/06964 |
| | | | 375/347 |

OTHER PUBLICATIONS

"3rd Generation Partnership Project; Technical Specification Group Radio Access Network; NR; User Equipment (UE) radio access capabilities (Release 17)", Technical Specification, 3GPP TS 38.306 V17.6.0 (Sep. 2023), 257 Pages.

"3rd Generation Partnership Project; Technical Specification Group Radio Access Network; NR; User Equipment (UE) radio transmission and reception; Part 2: Range 2 Standalone (Release 18)", Technical Specification, 3GPP TS 38.101-2 V18.3.0 (Sep. 2023), 228 Pages.

"5G; NR; Medium Access Control (MAC) protocol specification (3GPP TS 38.321 version 17.6.0 Release 17)", Technical Specification, ETSI TS 138 321 V17.6.0 (Oct. 2023), 255 Pages.

(Continued)

*Primary Examiner* — John J Lee
(74) *Attorney, Agent, or Firm* — Ericsson Inc.

(57) ABSTRACT

A method, system and apparatus are disclosed. A method implemented in a user equipment, UE, is provided. A physical random access channel, PRACH, transmission is triggered based on at least one condition being met. The PRACH transmission is performed according to a power level, where the power level is based on a first power reduction value associated with a power management maximum power reduction, P-MPR, and the first power reduction value is less than a second power reduction value of a power reduction applied to an uplink transmission other than the PRACH transmission.

18 Claims, 7 Drawing Sheets

(56) References Cited

OTHER PUBLICATIONS

"eCFR :: 47 CFR 1.1310, Radiofrequency radiation exposure limits", Title 47—Telecommunication, Chapter I—Federal Communications Commission, Subchapter A—General, Part 1—Practice and Procedure, Subpart I—Procedures Implementing the National Environmental Policy Act of 1969, Date accessed Oct. 1, 2024. Displaying title 47, up to date as of Sep. 27, 2024, Title 47 was last amended Sep. 26, 2024, 3 Pages.
Apple, "P-MPR Reporting", 3GPP TSG-RAN WG2 Meeting #109bis-e, R2-2002820, Apr. 20-Apr. 30, 2020, 3 Pages, Elbonia.
Ericsson, "P-MPR for PRACH", 3GPP TSG-RAN WG4 Meeting #106, R4-2302421, Feb. 27-Mar. 3, 2023, 2 Pages, Athens.

\* cited by examiner

APPLYING POWER MANAGEMENT FOR PHYSICAL RANDOM ACCESS CHANNEL (PRACH)

RELATED APPLICATION

The present application is a continuation of International Application No. PCT/CN2024/132494, filed on Nov. 15, 2024, entitled "APPLYING POWER MANAGEMENT FOR PHYSICAL RANDOM ACCESS CHANNEL (PRACH)," the disclosure of which is hereby incorporated herein by reference in its entirety.

TECHNICAL FIELD

The present disclosure relates to wireless communications, and in particular, to power management for transmission.

BACKGROUND

The Third Generation Partnership Project (3GPP) has developed and is developing standards for Fourth Generation (4G) (also referred to as Long Term Evolution (LTE)) and Fifth Generation (5G) (also referred to as New Radio (NR)) wireless communication systems. Such systems provide, among other features, broadband communication between network nodes, such as base stations, and user equipment (UE), as well as communication between network nodes and between UEs. The 3GPP is also developing standards for Sixth Generation (6G) wireless communication networks.

Maximum Permissible Exposure (MPE) Requirements

Power management for wireless communications is applied for compliance with Maximum Permissible Exposure (MPE) limits. This power management is up to user equipment (UE) implementation, and typically implies power back-off (reduction) for transmissions exceeding implementation-specific duty cycles. Further, the power management is applied to transmissions by all radio access technologies (RATs) and frequency ranges supported by the UE. The algorithms for power management are thus proprietary.

MPE requirements are specified as SAR (Specific Absorption Ratio) for transmissions below 6 GHz and by MPE limits, usually in terms of radiation intensity (W/m2) for transmissions above 10 GHz, i.e., in NR frequency range 2 (FR2).

The MPE requirements are defined from 47 CFR § 1.1310 as follows:

Radiofrequency Radiation Exposure Limits.
(a) Specific absorption rate (SAR) shall be used to evaluate the environmental impact of human exposure to radiofrequency (RF) radiation as specified in 47 CFR § 1.1307(b) of this part within the frequency range of 100 kHz to 6 GHz (inclusive).
(b) The SAR limits for occupational/controlled exposure are 0.4 W/kg, as averaged over the whole body, and a peak spatial-average SAR of 8 W/kg, averaged over any 1 gram of tissue (defined as a tissue volume in the shape of a cube). Exceptions are the parts of the human body treated as extremities, such as hands, wrists, feet, ankles, and pinnae, where the peak spatial-average SAR limit for occupational/controlled exposure is 20 W/kg, averaged over any 10 grams of tissue (defined as a tissue volume in the shape of a cube). Exposure may be averaged over a time period not to exceed 6 minutes to determine compliance with occupational/controlled SAR limits.
[ . . . ] (e)
(e)
(1) Table 1 to 47 CFR § 1.1310(e) (1) sets forth limits for Maximum Permissible Exposure (MPE) to radiofrequency electromagnetic fields.

Table 1 to 47 CFR § 1.1310(e)(1)-Limits for Maximum Permissible Exposure (MPE)

| Frequency range (MHz) | Electric field strength (V/m) | Magnetic field strength (A/m) | Power density (mW/cm$^2$) | Averaging time (minutes) |
|---|---|---|---|---|
| (i) Limits for Occupational/Controlled Exposure | | | | |
| 0.3-3.0 | 614 | 1.63 | *(100) | ≤6 |
| 3.0-30 | 1842/f | 4.89/f | *(900/f$^2$) | <6 |
| 30-300 | 61.4 | 0.163 | 1.0 | <6 |
| 300-1,500 | | | f/300 | <6 |
| 1,500-100,000 | | | 5 | <6 |
| (ii) Limits for General Population/Uncontrolled Exposure | | | | |
| 0.3-1.34 | 614 | 1.63 | *(100) | <30 |
| 1.34-30 | 824/f | 2.19/f | *(180/f$^2$) | <30 |
| 30-300 | 27.5 | 0.073 | 0.2 | <30 |
| 300-1,500 | | | f/1500 | <30 |
| 1,500-100,000 | | | 1.0 | <30 | f = frequency in MHz.
*Plane-wave equivalent power density.

A UE supporting operation below 6 GHz, e.g., frequency range 1 (FR1) for which specific absorption ratio (SAR) applies and simultaneous operation above 10 GHz, e.g., FR2 for which MPE limits apply is usually subject to a weighted metric denoted TER. This means that transmissions in one frequency range, e.g., FR2 must be reduced in power or duty cycle in case transmissions in the other frequency range, e.g., FR1, is at a power level near the SAR limit.

According to the Federal Communications Commission's (FCC's) TER, it's mandatory for the UE to fulfill the total exposure ratio as follows. As TER is an equation with two parts, SAR and MPE that must be <1, which means how much SAR or MPE are contributing to the equation are proprietary solutions from UE side.

In particular, the TER is calculated by combining all SAR measurements and power density measurements after normalizing to their respective limits. The general expression is below.

$$TER = \sum_{a=1}^{A} \frac{SAR_a}{SAR_a, \text{limit}} + \sum_{b=1}^{B} \frac{psPD_b}{psPD_b, \text{limit}} < 1$$

The TER shall be less than unity to ensure compliance with the limits.

$$\sum_{n=1}^{N} \frac{4G\, SAR_n}{4G\, SAR_n, \text{limit}} +$$

$$\sum_{m=1}^{M} \frac{5G\,\text{mmW}\, NR\, psPD_m}{5G\,\text{mmW}\, NR\, psPD_m, \text{limit}} + \sum_{p=1}^{P} \frac{WLAN\, SAR_p}{WLAN\, SAR_p, \text{limit}} < 1$$

An example Smart Transmit algorithm for wireless wide area network (WWAN) adds directly the time-averaged RF exposure from 4G and time-averaged RF exposure from 5G mmW NR. The Smart Transmit algorithm controls the total RF exposure from both 4G and 5G mmW NR to not exceed FCC limit. Therefore, per FCC guidance, TER does not need to be evaluated directly for the 4G and 5G simultaneous compliance via summation. The validation of the time-averaging algorithm and compliance under the Tx varying transmission scenario for WWAN technologies are reported in a Near-Field Power Density Evaluation Report (FCC report ID: NFV600VM).

$$\sum_{n=1}^{N} \frac{4G\, SAR_n}{4G\, SAR_n, \text{limit}} + \sum_{p=1}^{P} \frac{WLAN\, SAR_p}{WLAN\, SAR_p, \text{limit}} < 1$$

$$\sum_{m=1}^{M} \frac{5G\,\text{mmW}\, NR\, psPD_m}{5G\,\text{mmW}\, NR\, psPD_m, \text{limit}} + \sum_{p=1}^{P} \frac{WLAN\, SAR_p}{WLAN\, SAR_p, \text{limit}} < 1$$

For 5G mmW NR, since there is total design-related uncertainty arising from TxAGC (e.g., transmitter automatic gain control) and device-to-device variation, the worst-case RF exposure should be determined by accounting for this device uncertainty of 2.8 dB. The Smart Transmit algorithm limits PD exposure to 75% of maximum to provide at least 25% margin allocated for 4G LTE anchor due to the 3 dB reserve power margin used in the device. Therefore, 5G mmW NR RF exposure for this device under test (DUT) is evaluated by reported psPD calculated as:

$$\text{reported\_psPD} = 75\% \times \text{PD\_design\_target} + 2.8\,\text{dB} = 7.5\,\text{W/m}^2$$

Note that since not all the beams supported by this EUT are measured, reported_psPD cannot be computed based on limited measured psPD data. Alternatively, since measured psPD for all the beams will be ≤PD_design_target+2.8 dB uncertainty, reported_psPD is computed based on this worst-case PSPD as shown above.

MaxUplinkDutyCycle Definition

The maximum duty cycle supported by a UE at maximum output power in a frequency range, e.g., FR2, can be indicated to the network for use by the network for UL scheduling. However, the UE is still allowed to apply any power reduction for MPE compliance if needed, notwithstanding the indicated duty cycle.

The max UplinkDutyCycle is defined as a UE capability in 3GPP (e.g., 3GPP TS 38.306, v17.6.0) as follows, where the maxUplinkDutyCycle-FR2 is particularly useful for FR2 for at the UE side to indicate how much uplink transmission should apply the maximum transmission power.

TABLE 2

| MaxUplinkDutyCycle related to configured transmitted power | | | | |
|---|---|---|---|---|
| maxUplinkDutyCycle-PC2-FR1 Indicates the maximum percentage of symbols during a certain evaluation period that can be scheduled for uplink transmission to ensure compliance with applicable electromagnetic energy absorption requirements provided by regulatory bodies. This field is applicable for FR1 power class 2 UE and also applicable for FR1 power class 1.5 UE as specified in clause 6.2.1 of TS 38.101-1 [2]. If the field and maxUplinkDutyCycle-PC1dot5-MPE-FR1-r16 are both absent, 50% shall be applied as the upper limit of the UL duty cycle for power class 2. Value n60 corresponds to 60%, value n70 corresponds to 70% and so on. This capability is not applicable to IAB-MT. | Band | No | N/A | FR1 only |
| maxUplinkDutyCycle-FR2 Indicates the maximum percentage of symbols during 1 s that can be scheduled for uplink transmission at the UE maximum transmission power, so as to ensure compliance with applicable electromagnetic power density exposure requirements provided by regulatory bodies. This field is applicable for all power classes UE in FR2 as specified in TS 38.101-2 [3]. Value n15 corresponds to 15%, value n20 corresponds to 20% and so on. If the field is absent or the percentage of uplink symbols transmitted within any 1s evaluation period is larger than max UplinkDutyCycle-FR2, the UE behaviour is specified in TS 38.101-2 [3]. This capability is not applicable to IAB-MT. | Band | No | N/A | FR2 only |

TABLE 2-continued

| MaxUplinkDutyCycle related to configured transmitted power | | | | |
|---|---|---|---|---|
| maxUplinkDutyCycle-PC1dot5-MPE-FR1-r16 Indicates the maximum percentage of symbols during a certain evaluation period that can be scheduled for uplink transmission to ensure compliance with applicable electromagnetic energy absorption requirements provided by regulatory bodies. This field is only applicable for FR1 power class 1.5 UE as specified in clause 6.2.1 of TS 38.101-1 [2]. If the field and maxUplinkDutyCycle-PC2-FR1 are both absent, 25% shall be applied as the upper limit of the UL duty cycle for power class 1.5. | Band | No | N/A | FR1 only |

The maxUplinkDutyCycle-FR2 is related to uplink transmission in FR2 with the configured transmitted power defined in 3GPP (e.g., 3GPP TS 38.101-2, v18.3.0) as follows.

Configured Transmitted Power

The UE can configure its maximum output power. The configured UE maximum output power $P_{CMAX,f,c}$ for carrier f of a serving cell c is defined as that available to the reference point of a given transmitter branch that corresponds to the reference point of the higher-layer filtered received signal received power (RSRP) measurement as specified in 3GPP (e.g., 3GPP TS 38.215).

The configured UE maximum output power $P_{CMAX,f,c}$ for carrier f of a serving cell c shall be set such that the corresponding measured peak equivalent isotropically radiated power (EIRP) $P_{UMAX,f,c}$ is within the following bounds $$P_{Powerclass} + \Delta P_{IBE} - \text{MAX}(\text{MAX}(MPR_{f,c}, A\text{-}MPR_{f,c}) + \Delta MB_{P,n}, P\text{-}MPR_{f,c}) - \text{MAX}\{T(\text{MAX}(MPR_{f,c}, A\text{-}MPR_{f,c})), T(P\text{-}MPR_{f,c})\} \leq P_{UMAX,f,c} \leq EIRP_{max}$$

while the corresponding measured total radiated power $P_{TMAX,f,c}$ is bounded by $$P_{TMAX,f,c} \leq TRP_{max}$$

with $P_{Powerclass}$ the UE minimum peak EIRP as specified in sub-clause 6.2.1, $EIRP_{max}$ the applicable maximum EIRP as specified in sub-clause 6.2.1, $MPR_{f,c}$ as specified in sub-clause 6.2.2, $A\text{-}MPR_{f,c}$ as specified in sub-clause 6.2.3, $\Delta MB_{P,n}$ the peak EIRP relaxation as specified in clause 6.2.1 and $TRP_{max}$ the maximum TRP for the UE power class as specified in sub-clause 6.2.1. $\Delta P_{IBE}$ is 1.0 dB if UE declares support for mpr-PowerBoost-FR2-r16, UL transmission is QPSK, $MPR_{f,c}=0$ and when NS_200 applies and the network configures the UE to operate with mpr-PowerBoost-FR2-r16 otherwise $\Delta P_{IBE}$ is 0.0 dB. The requirement is verified in the beam peak direction.

maxUplinkDutyCycle-FR2, as defined in 3GPP TS 38.306, is a UE capability to facilitate electromagnetic power density exposure requirements. This UE capability is applicable to all FR2 power classes.

If the field of UE capability maxUplinkDutyCycle-FR2 is present and the percentage of uplink symbols transmitted including any PRACH transmission within any 1 s evaluation period is larger than maxUplinkDutyCycle-FR2, the UE follows the uplink scheduling and can apply P-MPR$_{f,c}$.

If the field of UE capability maxUplinkDutyCycle-FR2 is absent, the compliance to electromagnetic power density exposure requirements are ensured by means of scaling down the power density or by other means.

P-MPR$_{f,c}$ is the power management maximum output power reduction. The UE shall apply P-MPR$_{f,c}$ for carrier f of serving cell c only for the cases described below. For UE conformance testing P-MPR$_{f,c}$ shall be 0 dB, except for the testing of UL gap for Tx power management, where P-MPR$_{f,c}$ may be non-zero dB.

a) Ensuring compliance with applicable electromagnetic power density exposure requirements and addressing unwanted emissions/self desense requirements in case of simultaneous transmissions on multiple RAT(s) for scenarios not in scope of 3GPP RAN specifications. Self desense may refer to a transmitting device interfering with its own reception, thereby desensitizing it.

b) Ensuring compliance with applicable electromagnetic power density exposure requirements in case of proximity detection is used to address such requirements that require a lower maximum output power.

NOTE 1: P-MPR$_{f,c}$ was introduced in the $P_{CMAX,f,c}$ equation such that the UE can report to the gNB the available maximum output transmit power. This information can be used by the gNB for scheduling decisions.

NOTE 2: P-MPR$_{f,c}$ and maxUplinkDutyCycle-FR2 may impact the maximum uplink performance for the selected UL transmission path.

NOTE 3: MPE P-MPR Reporting capability tdd-MPE-P-MPR-Reporting-r16, as defined in 3GPP TS 38.306, is used to report P-MPR$_{f,c}$ when the reporting conditions configured by gNB are met. This UE capability is applicable to all FR2 power classes.

P-MPR as UE Power-Capability Fallback

Some device implementations use the P-MPR to modify the power capability for a serving cell for compliance with SAR and MPE exposure limits similar to a power-class change by $\Delta P_{power\ class}$. P-MPR can be applied regardless of any duty-cycle indication by a UE if present. However, the actual duty cycle of transmissions is usually controlled by the proprietary algorithms for power management implemented by the UE. The network is not aware of the definition of the duty cycle used by the UE, but the P-MPR can be indicated for FR2.

Given the time averaging used for exposure measurements (order of seconds or minutes) it is expected that the P-MPR due to high-power transmissions with large UL duty cycles is slowly changing similarly to the power class fallback $\Delta P_{power\ class}$.

Power reduction by P-MPR is not specified (proprietary configuration) and can also be used for mitigation exposure compliance due to e.g., proximity detection (operation of the device close to the body of the user), transmission on another uncoordinated radio access technology not controlled by the base station and connection for which the power class/capability is relevant.

PHR for MPE P-MPR

The PHR is defined in 3GPP (e.g., 3GPP TS 38.321, v17.6.0) as follows, which includes the MPE P-MPR as the indication of the power backoff to meet the MPE FR2 requirements.

Power Headroom Reporting

The Power Headroom reporting procedure is used to provide the serving gNB with the following information:
  Type 1 power headroom: the difference between the nominal UE maximum transmit power and the estimated power for UL-SCH transmission per activated Serving Cell;
  Type 2 power headroom: the difference between the nominal UE maximum transmit power and the estimated power for UL-SCH and PUCCH transmission on SpCell of the other MAC entity (i.e., E-UTRA MAC entity in EN-DC, NE-DC, and NGEN-DC cases);
  Type 3 power headroom: the difference between the nominal UE maximum transmit power and the estimated power for SRS transmission per activated Serving Cell;
  MPE P-MPR: the power backoff to meet the MPE FR2 requirements for a Serving Cell operating on FR2.

RRC controls Power Headroom reporting by configuring the following parameters:
  phr-PeriodicTimer;
  phr-ProhibitTimer;
  phr-Tx-PowerFactorChange;
  phr-Type2OtherCell;
  phr-ModeOtherCG;
  multiplePHR;
  mpe-Reporting-FR2;
  mpe-ProhibitTimer;
  mpe-Threshold;
  numberOfN;
  mpe-ResourcePoolToAddModList;
  twoPHRMode.

A Power Headroom Report (PHR) shall be triggered if any of the following events occur:
  [ . . . ]
  if mpe-Reporting-FR2 is configured, and mpe-ProhibitTimer is not running:
    the measured P-MPR applied to meet FR2 MPE requirements as specified in 3GPP TS 38.101-2 is equal to or larger than mpe-Threshold for at least one activated FR2 Serving Cell since the last transmission of a PHR in this MAC entity; or
    the measured P-MPR applied to meet FR2 MPE requirements as specified in 3GPP TS 38.101-2 has changed more than phr-Tx-PowerFactorChange dB for at least one activated FR2 Serving Cell since the last transmission of a PHR due to the measured P-MPR applied to meet MPE requirements being equal to or larger than mpe-Threshold in this MAC entity.
  in which case the PHR is referred below to as 'MPE P-MPR report'.
  NOTE 2: The MAC entity should avoid triggering a PHR when the required power backoff due to power management decreases only temporarily (e.g., for up to a few tens of milliseconds) and it should avoid reflecting such temporary decrease in the values of $P_{CMAX,f,c}$/PH when a PHR is triggered by other triggering conditions.
  NOTE 3: If a hybrid automatic repeat request (HARQ) process is configured with cg-RetransmissionTimer and if the PHR is already included in a MAC protocol data unit (PDU) for transmission on a configured grant by this HARQ process, but not yet transmitted by lower layers, it is up to UE implementation how to handle the PHR content.

If the MAC entity has UL resources allocated for a new transmission, the MAC entity shall:
  1> if it is the first UL resource allocated for a new transmission since the last MAC reset:
    2> start phr-PeriodicTimer.
  1> if the Power Headroom reporting procedure determines that at least one PHR has been triggered and not cancelled; and
  1> if the allocated UL resources can accommodate the MAC CE for PHR which the MAC entity is configured to transmit, plus its subheader, as a result of link control protocol (LCP) as defined in clause 5.4.3.1:
    [ . . . ]
    2> else (i.e., Single Entry PHR format is used):
      3> if this MAC entity is configured with twoPHR-Mode:
        4> obtain two values of the Type 1 power headroom from the physical layer for the corresponding uplink carrier of the PCell.
      3> else:
        4> obtain the value of the Type 1 power headroom from the physical layer for the corresponding uplink carrier of the PCell.
      3> obtain the value for the corresponding $P_{CMAX,f,c}$ field from the physical layer;
      3> if mpe-Reporting-FR2 is configured and this Serving Cell operates on FR2:
        4> obtain the value for the corresponding MPE field from the physical layer.
      3> if mpe-Reporting-FR2-r17 is configured and this Serving Cell operates on FR2 and this Serving Cell is associated to this MAC entity:
        4> obtain the value for the corresponding MPEi field from the physical layer;
        4> obtain the value for the corresponding Resource; field from the physical layer.
      3> instruct the Multiplexing and Assembly procedure to generate and transmit the Enhanced Single entry PHR as defined in clause 6.1.3.48 if this MAC entity is configured with mpe-Reporting-FR2-r17 or the Enhanced Single Entry PHR for multiple TRP MAC CE as defined in clause 6.1.3.50 if this MAC entity is configured with twoPHRMode or the Single Entry PHR MAC CE as defined in clause 6.1.3.8 otherwise based on the values reported by the physical layer.
    2> if this PHR report is an MPE P-MPR report:
      3> start or restart the mpe-ProhibitTimer;
      3> cancel triggered MPE P-MPR reporting for Serving Cells included in the PHR MAC CE.
    2> start or restart phr-PeriodicTimer;
    2> start or restart phr-ProhibitTimer;
    2> cancel all triggered PHR(s).

All triggered PHRs shall be cancelled when there is an ongoing SDT procedure as in clause 5.27 and the UL grant(s) can accommodate all pending data available for transmission but is not sufficient to additionally accommodate the PHR MAC CE plus its subheader.

MAC Entry for Reporting PHR

The MAC entry for reporting PHR which includes the Pc_max, P and P-MPR defined as following as for example for single entry from 3GPP (e.g., 3GPP TS 38.321, v17.6.0).

Single Entry PHR MAC CE

The Single Entry PHR MAC CE is identified by a MAC subheader with logical channel ID (LCID) as specified in Table 6.2.1-2.

It has a fixed size and consists of two octets defined as follows (FIG. 1):

R: Reserved bit, set to 0;

Power Headroom (PH): This field indicates the power headroom level. The length of the field is 6 bits. The reported PH and the corresponding power headroom levels are shown in Table 6.1.3.8-1 below (the corresponding measured values in dB are specified in 3GPP TS 38.133);

P: If mpe-Reporting-FR2 is configured and the Serving Cell operates on FR2, the MAC entity shall set this field to 0 if the applied P-MPR value, to meet MPE requirements, as specified in 3GPP TS 38.101-2, is less than P-MPR_00 as specified in 3GPP TS 38.133 and to 1 otherwise. If mpe-Reporting-FR2 is not configured or the Serving Cell operates on FR1, this field indicates whether power backoff is applied due to power management (as allowed by P-MPR$_c$ as specified in 3GPP TS 38.101-1, 3GPP TS 38.101-2, and 3GPP TS 38.101-3). The MAC entity shall set the P field to 1 if the corresponding $P_{CMAX,f,c}$ field would have had a different value if no power backoff due to power management had been applied;

$P_{CMAX,f,c}$: This field indicates the $P_{CMAX,f,c}$ (as specified in 3GPP TS 38.213) used for calculation of the preceding PH field. The reported $P_{CMAX,f,c}$ and the corresponding nominal UE transmit power levels are shown in Table 6.1.3.8-2 (the corresponding measured values in dBm are specified in 3GPP TS 38.133);

MPE: If mpe-Reporting-FR2 is configured, and the Serving Cell operates on FR2, and if the P field is set to 1, this field indicates the applied power backoff to meet MPE requirements, as specified in 3GPP TS 38.101-2. This field indicates an index to Table 6.1.3.8-3 and the corresponding measured values of P-MPR levels in dB are specified in 3GPP TS 38.133. The length of the field is 2 bits. If mpe-Reporting-FR2 is not configured, or if the Serving Cell operates on FR1, or if the P field is set to 0, R bits are present instead.

TABLE 6.1.3.8-1

Power Headroom levels for PHR

| PH | Power Headroom Level |
|---|---|
| 0 | POWER_HEADROOM_0 |
| 1 | POWER_HEADROOM_1 |
| 2 | POWER_HEADROOM_2 |
| 3 | POWER_HEADROOM_3 |
| ... | ... |
| 60 | POWER_HEADROOM_60 |
| 61 | POWER_HEADROOM_61 |
| 62 | POWER_HEADROOM_62 |
| 63 | POWER_HEADROOM_63 |

TABLE 6.1.3.8-2

Nominal UE transmit power level for PHR

| $P_{CMAX,f,c}$ | Nominal UE transmit power level |
|---|---|
| 0 | PCMAX_C_00 |
| 1 | PCMAX_C_01 |
| 2 | PCMAX_C_02 |

TABLE 6.1.3.8-2-continued

Nominal UE transmit power level for PHR

| $P_{CMAX,f,c}$ | Nominal UE transmit power level |
|---|---|
| ... | ... |
| 61 | PCMAX_C_61 |
| 62 | PCMAX_C_62 |
| 63 | PCMAX_C_63 |

TABLE 6.1.3.8-3

Effective power reduction for MPE P-MPR

| MPE | Measured P-MPR value |
|---|---|
| 0 | P-MPR_00 |
| 1 | P-MPR_01 |
| 2 | P-MPR_02 |
| 3 | P-MPR_03 |

TABLE 10.1.18.1-1

Mapping of $P_{CMAX,c,f}$

| Reported value | Measured quantity value | Unit |
|---|---|---|
| PCMAX_C_00 | $P_{CMAX,c,f} < -29$ | dBm |
| PCMAX_C_01 | $-29 \leq P_{CMAX,c,f} < -28$ | dBm |
| PCMAX_C_02 | $-28 \leq P_{CMAX,c,f} < -27$ | dBm |
| ... | ... | ... |
| PCMAX_C_61 | $31 \leq P_{CMAX,c,f} < 32$ | dBm |
| PCMAX_C_62 | $32 \leq P_{CMAX,c,f} < 33$ | dBm |
| PCMAX_C_63 | $33 \leq P_{CMAX,c,f}$ | dBm |

TABLE 10.1.26.1-1

Mapping of FR2 P-MPR

| Reported value | Measured quantity value | Unit |
|---|---|---|
| P-MPR_00 | $3 \leq PMP\text{-}R < 6$ | dB |
| P-MPR_01 | $6 \leq PMP\text{-}R < 9$ | dB |
| P-MPR_02 | $9 \leq PMP\text{-}R < 12$ | dB |
| P-MPR_03 | $PMP\text{-}R \geq 12$ | dB |

However, there is no power control mechanism specified from 3GPP on how the power control is performed between FR1 and FR2 from UE side.

SUMMARY

Some embodiments advantageously provide methods, systems, and apparatuses for power management for transmission.

One or more embodiments described herein address the UE implementation solutions to ensure a stable connection in, e.g., FR2 carriers, with no power-back off applied to the high-priority PRACH notwithstanding the duty cycle and power of other transmissions or indicated duty-cycle capability. PRACH transmissions without power back-off have a limited impact on other transmission and the MPE ratio since the duty cycle of the PRACH is usually short and the RACH occasions known by the UE.

One or more embodiments described herein are for one or more of the following conditions.

Beam failure recovery on FR2 carriers.
  PRACH transmitted without power back-off during the recovery notwithstanding power reductions for earlier transmissions Beam management in first phase as P1 where only synchronization signal blocks (SSBs) are used for measurement relying fully on beam correspondence (no beam management), and the PRACH is sent through the UE implementation specific beam by the UE, without the PRACH power back-off, below advantage can be achieved.

One advantage is to improve the PRACH performance because the beam refinement occurs after PRACH transmission.

Beam failure recovery with previous transmission on FR2.

EN-DC/FR1+FR2 CA establishment

PRACH is transmitted without power back-off when the secondary cell group (NR FR2) is added notwithstanding power reductions, if applicable, for earlier transmissions in FR1 in the primary cell group (LTE)

PRACH transmissions at full power during configuration of a Scell in FR2 with a Pcell in FR1 for UL CA with FR2 cell is in either an initial phase of the connection or unstable connection status (losing connection)

UL heavy data transmission with large duty cycles, e.g., UL/DL configuration with more UL subframes than DL subframes With UE implementation specific beam selection, applying power backoff for PRACH transmission incurs PRACH performance loss. To illustrate this, the performances of multiple PRACH transmissions with the same wide beam and different beams is shown in FIG. 2. Also, 2 dB gain in terms of miss-detection rate can be observed when doubling the number of PRACH transmissions with the same beam. In addition, for a given number of PRACH transmissions, those with beam sweeping has about 1 dB gain over those with the same wide beam. In short, when doubling the number of PRACH transmissions, at least 2 dB gain can be expected. The performance gain of a larger number of PRACH transmission power comes from the aggregated transmission power. Two PRACH transmissions, if combined non-coherently, can be analogous to increasing a single PRACH's transmission power by 3 dB. Thus, reducing PRACH transmission power by 3 dB would cause at least 2 dB degradation of miss-detection rate.

One or more embodiments described herein provides a method implemented in a wireless device that is configured to communicate with a network node, the method comprising:

Triggering a PRACH transmission to the network node,
Applying a power level to the PRACH transmission with a first maximum transmission power,
wherein the first maximum transmission power is without any power back off (applied with a first power reduction for power management where the reduction is zero),
depending on i) an event that triggered the PRACH transmission, and/or ii) a configuration obtained at the wireless device, and/or iii) a channel condition.

One or more embodiments described herein provides a method for a wireless device or a UE that is configured to communicate with a network node, the method comprising:

Triggering a PRACH transmission to the network node,
Applying a power level to the PRACH transmission with a first maximum transmission power,
wherein the first maximum transmission power is applied with a first power reduction for power management,
depending on i) an event that triggered the PRACH transmission, and/or ii) a configuration obtained at the wireless device, and/or iii) a channel condition.

When there are other UL transmissions than PRACH,
Applying a power level to the other UL transmissions with a second maximum transmission power,
wherein the second maximum transmission power is applied with a second power reduction for power management, Wherein the first power reduction for power management is 0 or smaller than the second power reduction for power management. Wherein the power reduction difference between the first power reduction and the second power reduction may be up to the UE MPE reporting.

One aspect of the present disclosure is that even though the UE reduces power for some transmissions and indicates that it does this through PHR reporting, the UE does not apply any power back off on PRACH (or to PRACH transmissions), meaning the first power reduction is zero and PRACH is applying maximum transmission power when it's required to get stable PRACH for a stable connection. Further, a "smaller" term may also be added. Here the "smaller" term is relative to comparing the first power reduction to the second power reduction, where the maximum transmission power can be determined through tests and the first and second power reduction is applied to the maximum transmission power, thereby leaving a relative comparison to be rather visible and specific and not indefinite.

In one or more embodiments, when there are other UL transmissions than PRACH,

Reporting of a power headroom report (PHR) is performed, wherein the PHR comprises at least one of the following,
Pc_max;
P bit;
MPE/P-MPR; and
Delta_P.

Wherein the second maximum transmission power with the second power reduction for power management applied to the other UL transmission is indicated in the PHR.

According to one or more embodiments, the event that triggers the PRACH transmission is at least one of the following:
A failure event;
A mobility event;
A timing related event;
A data arrival or request event; and
An RRC connection event.

In one or more embodiments, the configuration obtained at the UE is at least one of the following:
PRACH configurations;
Operating frequency; and
L1 configurations.

In one or more embodiments, the channel condition is at least one of the following:
Signal strength with or without interference;
Coexistence with other technologies; and
Pathloss estimate.

According to one aspect of the present disclosure, a method implemented in a user equipment, UE, is provided.

A physical random access channel, PRACH, transmission is triggered based on at least one condition is met. The PRACH transmission is performed according to a power level, where the power level is based on a first power reduction value associated with a power management maximum power reduction, P-MPR, and the first power reduction value is less than a second power reduction value of a power reduction applied to an uplink transmission other than the PRACH transmission.

According to one or more embodiments of this aspect, a power headroom report, PHR, indicating the second power reduction value to the uplink transmission other than the PRACH transmission is reported.

According to one or more embodiments of this aspect, the second power reduction of the uplink transmission other than the PRACH transmission using at least one of: delta_P value and P-bit value is reported.

According to one or more embodiments of this aspect, the first power reduction value is a zero value, and the power level of the PRACH transmission corresponds to a first maximum transmission power level for the UE.

According to one or more embodiments of this aspect, the first power reduction value is configured to cause the PRACH transmission to comply with at least one predefined electromagnetic power density exposure requirement.

According to one or more embodiments of this aspect, the power level of the PRACH transmission corresponds to a first maximum transmission power level minus the first power reduction value.

According to one or more embodiments of this aspect, the first power reduction value is configured to cause the PRACH transmission to meet a predefined total exposure ratio, TER, requirement associated with electromagnetic exposure from the UE.

According to one or more embodiments of this aspect, the at least one condition comprises at least one of: a beam failure recovery condition, establishment of Frequency Range (FR) 1 and FR2 carrier aggregation, and a scheduling of more uplink subframes than downlink subframes.

According to one or more embodiments of this aspect, the first power reduction value for PRACH transmission is based on a coexistence of two radio access technologies, RATs, used by the UE.

According to another aspect of the present disclosure, a user equipment, UE, is provided. The UE is configured to trigger a physical random access channel, PRACH, transmission based on at least one condition is met, and perform the PRACH transmission according to a power level, where the power level is based on a first power reduction value associated with a power management maximum power reduction, P-MPR, and the first power reduction value is less than a second power reduction value of a power reduction applied to an uplink transmission other than the PRACH transmission.

According to one or more embodiments of this aspect, the UE is further configured to report a power headroom report, PHR, indicating the second power reduction value to the uplink transmission other than the PRACH transmission.

According to one or more embodiments of this aspect, the UE is further configured to report the second power reduction of the uplink transmission other than the PRACH transmission using at least one of: delta_P value and P-bit value.

According to one or more embodiments of this aspect, the first power reduction value is a zero value, and the power level of the PRACH transmission corresponds to a first maximum transmission power level for the UE.

According to one or more embodiments of this aspect, the first power reduction value is configured to cause the PRACH transmission to comply with at least one predefined electromagnetic power density exposure requirement.

According to one or more embodiments of this aspect, the power level of the PRACH transmission corresponds to a first maximum transmission power level minus the first power reduction value.

According to one or more embodiments of this aspect, the first power reduction value is configured to cause the PRACH transmission to meet a predefined total exposure ratio, TER, requirement associated with electromagnetic exposure from the UE.

According to one or more embodiments of this aspect, the at least one condition comprises at least one of: a beam failure recovery condition; establishment of Frequency Range (FR) 1 and FR2 carrier aggregation; and a scheduling of more uplink subframes than downlink subframes.

According to one or more embodiments of this aspect, the first power reduction value for PRACH transmission is based on a coexistence of two radio access technologies, RATs, used by the UE.

According to another aspect of the present disclosure, a computer readable storage medium is provided. The computer readable storage medium comprises instructions which, when executed by processing circuitry, cause the processing circuitry to perform a method, the method comprising: triggering a physical random access channel, PRACH, transmission based on at least one condition is met, and performing the PRACH transmission according to a power level, where the power level is based on a first power reduction value associated with a power management maximum power reduction, P-MPR, the first power reduction value being less than a second power reduction value of a power reduction applied to an uplink transmission other than the PRACH transmission.

According to one or more embodiments of this aspect, the instructions, when executed by the processing circuitry, cause the processing circuitry to perform the method as described herein.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
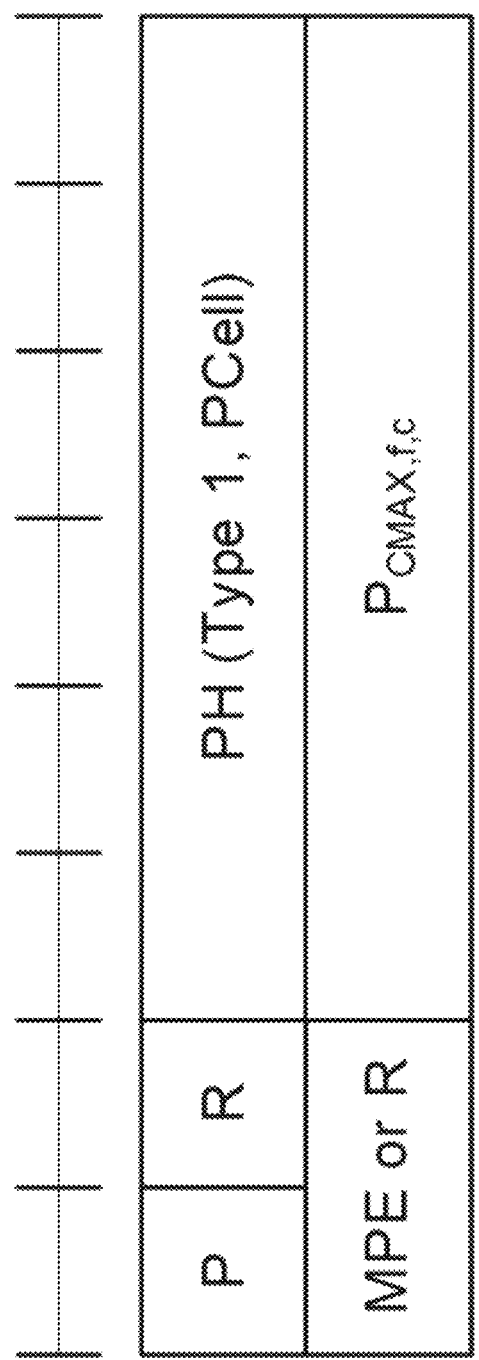
FIG. 1 is a diagram of a single entry PHR MAC CE.
Figure 2:
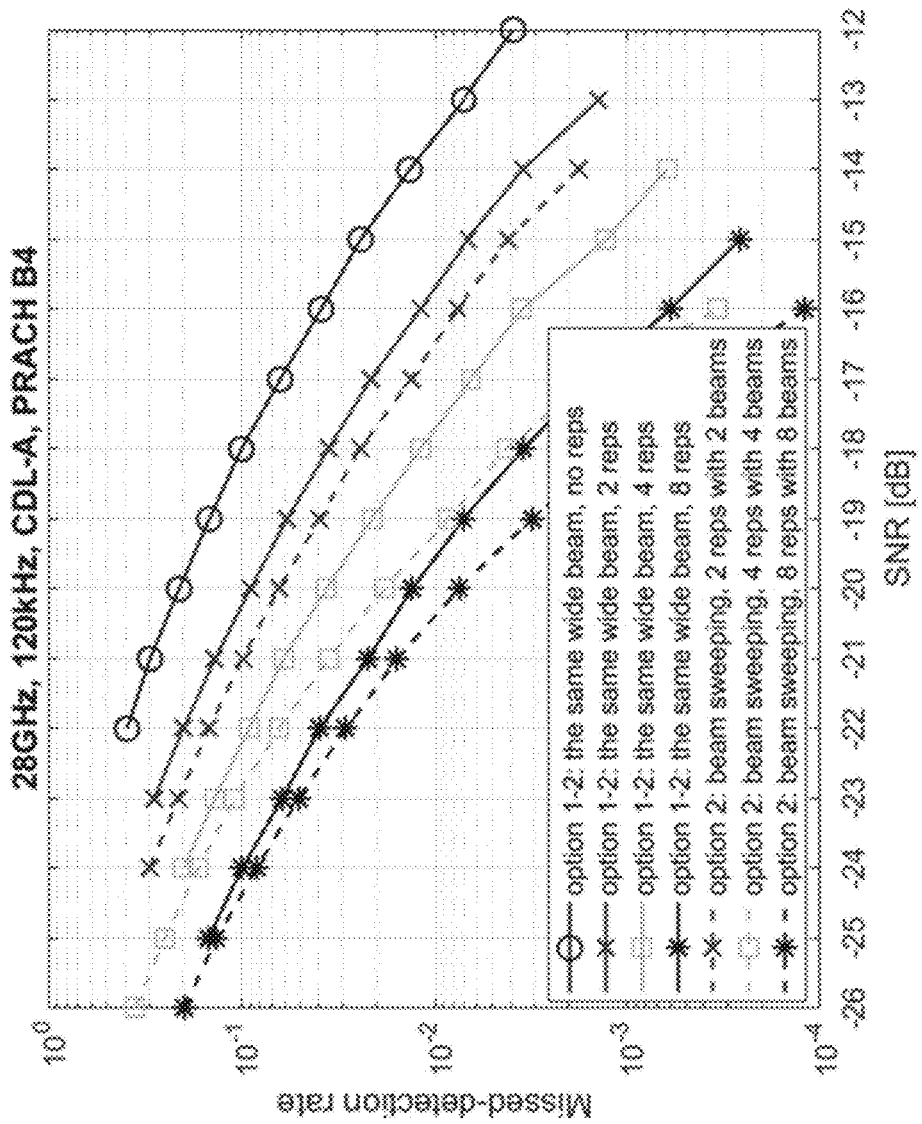
FIG. 2 is a diagram of miss-detection rate of multiple PRACH transmissions with the same wide beam or with beam sweeping.

As mentioned above, there is no power control mechanism specified from 3GPP on how the power control is done between FR1 and FR2 from UE side, even though there could be common radio and/or baseband components shared by FR1 and FR2 carriers. The TER is what the UE needs to fulfil but how much SAR or MPE are contributing to the equation are proprietary solutions from the UE side which means how to utilize the power allocation for FR1 and FR2 are UE implementations.

In real-world situations, in operators' networks, FR2 carrier is often dropped/deprioritized in EN-DC connection due to FR2 power limitation or total exposure ratio, which draws much attention and requires much effort from both the operators and network infrastructure vendor's side. A UE solution to ensure stable connection on FR2 is therefore needed with reasonable power allocation for FR2 carriers.

When UE starts to apply P-MPR due to the SAR limit or power density exposure requirements, the UE could apply the P-MPR to any UL transmission including scheduled and unscheduled transmission, e.g., PRACH. RACH capacity and performance is a key performance indicator (KPI) at the network and therefore, it will benefit to have robust and reliable PRACH connection even when the UE starts to apply P-MPR for other scheduled transmissions. This can also involve transmissions by other radio access technologies, e.g., LTE in an EN-DC connection.

For PRACH as it's also considered a higher priority channel when it's sent by the UE, it's not clear on how to ensure the robustness with a mechanism when it's not relying on the max UplinkDutyCycle.

The current 3GPP specification defines UE behaviors for FR2 when the UE capability "maxUplinkDutyCycle-FR2" is present for PRACH but when the capability is absent, it's only required to ensure the "the compliance to electromagnetic power density exposure requirements" by "means of scaling down the power density or by other means" without revealing details of the actual implementations on how to scale down the power density on which channels under which conditions or what are the other means. This is left for UE implementation.

For FR1, there is no specified UE behaviours for how to apply P-MPR, as long as the UE follows the generic SAR limitation for FR1 and fulfills the MPE requirements. Hence, a general solution to ensure a robust PRACH transmission with reasonable power allocation is needed.

One or more embodiments described herein address one or more of the problems described above.

Before describing in detail example embodiments, it is noted that the embodiments reside primarily in combinations of apparatus components and processing steps related to power management. Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein.

As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), base station for 6G communications, Node B, multi-standard radio (MSR) radio node such as MSR BS, multi-cell/multicast coordination entity (MCE), relay node, donor node controlling relay, radio access point (AP), transmission points, transmission nodes, Remote Radio Unit (RRU) Remote Radio Head (RRH), a core network node (e.g., mobile management entity (MME), self-organizing network (SON) node, a coordinating node, positioning node, MDT node, etc.), an external node (e.g., 3rd party node, a node external to the current network), nodes in distributed antenna system (DAS), a spectrum access system (SAS) node, an element management system (EMS), etc. The network node may also comprise test equipment. The term "radio node" used herein may be used to also denote a user equipment (UE) such as a wireless device (WD) or a radio network node.

In some embodiments, the non-limiting terms wireless device (WD) or a user equipment (UE) are used interchangeably. The UE herein can be any type of wireless device capable of communicating with a network node or another UE over radio signals, such as a wireless device (WD). The UE may also be a radio communication device, target device, device to device (D2D) UE, machine type UE or UE capable of machine to machine communication (M2M), low-cost and/or low-complexity UE, a sensor equipped with UE, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), relay node, access point, radio access point, Remote Radio Unit (RRU) Remote Radio Head (RRH).

Note that although terminology from one particular wireless system, such as, for example, 3GPP LTE and/or New Radio (NR) and/or 6G, may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a user equipment or a network node may be distributed over a plurality of user equipments and/or network nodes. In other words, it is contemplated that the functions of the network node and user equipment described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Some embodiments are directed to power management for transmission, e.g., PRACH transmission.

Figure 3:
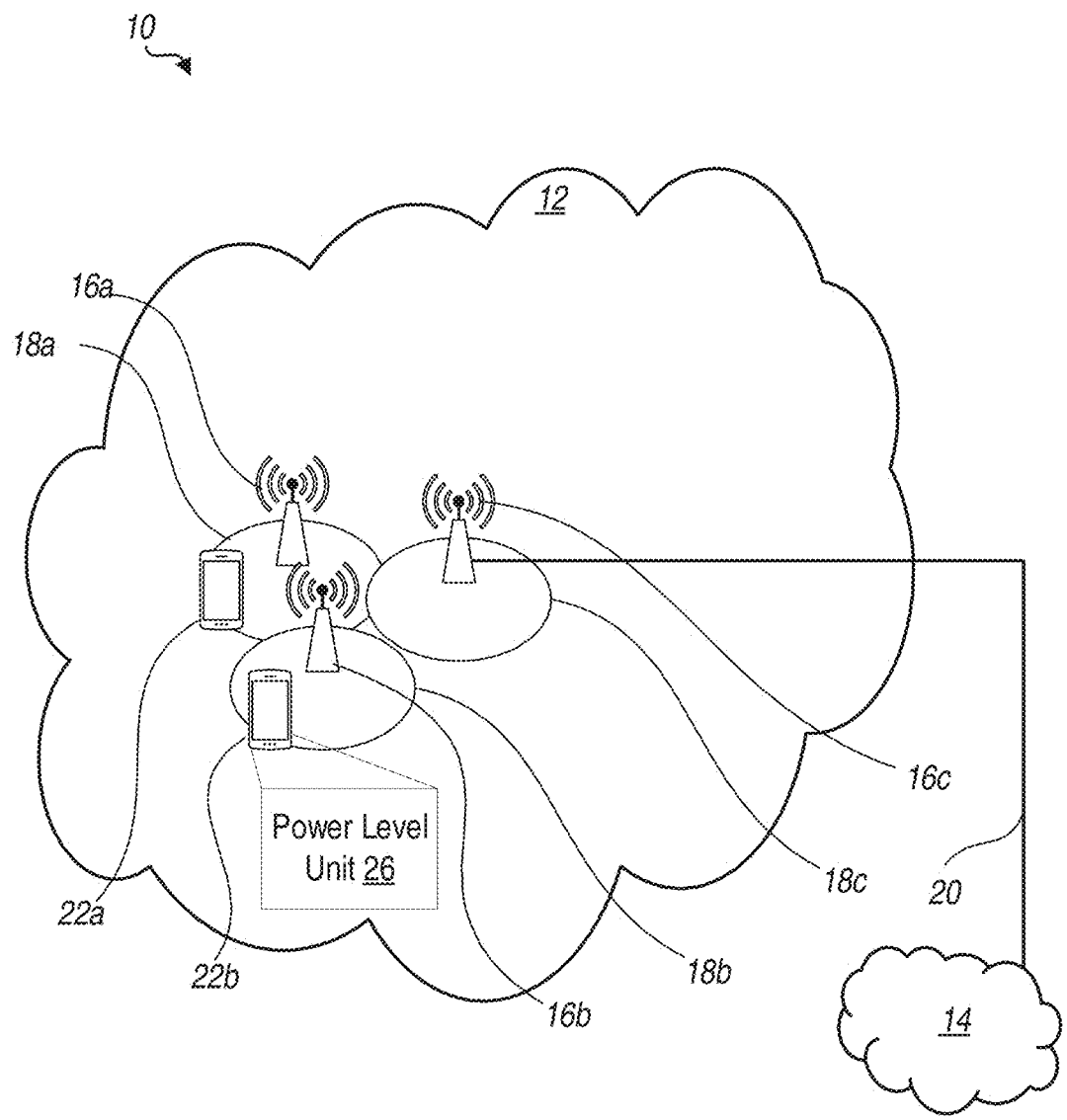
FIG. 3 is a schematic diagram of an example network architecture illustrating a communication system according to principles disclosed herein.

Referring again to the drawing figures, in which like elements are referred to by like reference numerals, there is shown in FIG. 3 a schematic diagram of a communication system 10, according to an embodiment, such as a 3GPP-type cellular network that may support standards such as LTE and/or NR (5G) and/or 6G, which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first user equipment (UE) 22a located in coverage area 18a is configured to wirelessly connect to, or be paged by, the corresponding network node 16a. A second UE 22b in coverage area 18b is wirelessly connectable to the corresponding network node 16b. While a plurality of UEs 22a, 22b (collectively referred to as user equipments 22) are illustrated in this example, the disclosed embodiments are equally applicable to a situation where a sole UE is in the coverage area or where a sole UE is connecting to the corresponding network node 16. Note that although only two UEs 22 and three network nodes 16 are shown for convenience, the communication system may include many more UEs 22 and network nodes 16.

Also, it is contemplated that a UE 22 can be in simultaneous communication and/or configured to separately communicate with more than one network node 16 and more than one type of network node 16. For example, a UE 22 can have dual connectivity with a network node 16 that supports LTE and the same or a different network node 16 that supports NR. As an example, UE 22 can be in communication with an eNB for LTE/E-UTRAN and a gNB for NR/NG-RAN, and a network node entity for 6G communications.

A user equipment 22 is configured to include a power level unit 26 which is configured to perform one or more UE 22 functions as described herein.

Example implementations, in accordance with an embodiment, of the UE 22 and network node 16 discussed in the preceding paragraphs will now be described with reference to FIG. 4.

The communication system 10 includes a network node 16 provided in a communication system 10 and including hardware 28 enabling it to communicate with the UE 22. The hardware 28 may include a radio interface 30 for setting up and maintaining at least a wireless connection 32 with a UE 22 located in a coverage area 18 served by the network node 16. The radio interface 30 may be formed as or may include, for example, one or more RF transmitters, one or more RF receivers, and/or one or more RF transceivers. The radio interface 30 includes an array of antennas 34 to radiate and receive signal(s) carrying electromagnetic waves.

In the embodiment shown, the hardware 28 of the network node 16 further includes processing circuitry 36. The processing circuitry 36 may include a processor 38 and a memory 40. In particular, in addition to or instead of a processor, such as a central processing unit, and memory, the processing circuitry 36 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 38 may be configured to access (e.g., write to and/or read from) the memory 40, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 42 stored internally in, for example, memory 40, or stored in external memory (e.g., database, storage array, network storage device, etc.) accessible by the network node 16 via an external connection. The software 42 may be executable by the processing circuitry 36. The processing circuitry 36 may be configured to control any of the methods and/or processes described herein and/or to cause such methods, and/or processes to be performed, e.g., by network node 16. Processor 38 corresponds to one or more processors 38 for performing network node 16 functions described herein. The memory 40 is configured to store data, programmatic software code and/or other information described herein. In some embodiments, the software 42 may include instructions that, when executed by the processor 38 and/or processing circuitry 36, causes the processor 38 and/or processing circuitry 36 to perform the processes described herein with respect to network node 16. For example, processing circuitry 36 of the network node 16 may include one or more units (not shown) which are configured to perform one or more network node 16 functions as described herein.

The communication system 10 further includes the UE 22 already referred to. The UE 22 may have hardware 44 that may include a radio interface 46 configured to set up and maintain a wireless connection 32 with a network node 16 serving a coverage area 18 in which the UE 22 is currently located. The radio interface 46 may be formed as or may include, for example, one or more RF transmitters, one or more RF receivers, and/or one or more RF transceivers. The radio interface 46 includes an array of antennas 48 to radiate and receive signal(s) carrying electromagnetic waves.

The hardware 44 of the UE 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the UE 22 may further comprise software 56, which is stored in, for example, memory 54 at the UE 22, or stored in external memory (e.g., database, storage array, network storage device, etc.) accessible by the UE 22. The software 56 may be executable by the processing circuitry 50. The software 56 may include a client application 58. The client application 58 may be operable to provide a service to a human or non-human user via the UE 22.

The processing circuitry 50 may be configured to control any of the methods and/or processes described herein and/or to cause such methods, and/or processes to be performed, e.g., by UE 22. The processor 52 corresponds to one or more processors 52 for performing UE 22 functions described herein. The UE 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to UE 22. For example, the processing circuitry 50 of the user equipment 22 may include power level unit 26 which is configured to perform one or more UE 22 functions as described herein.

Figure 4:
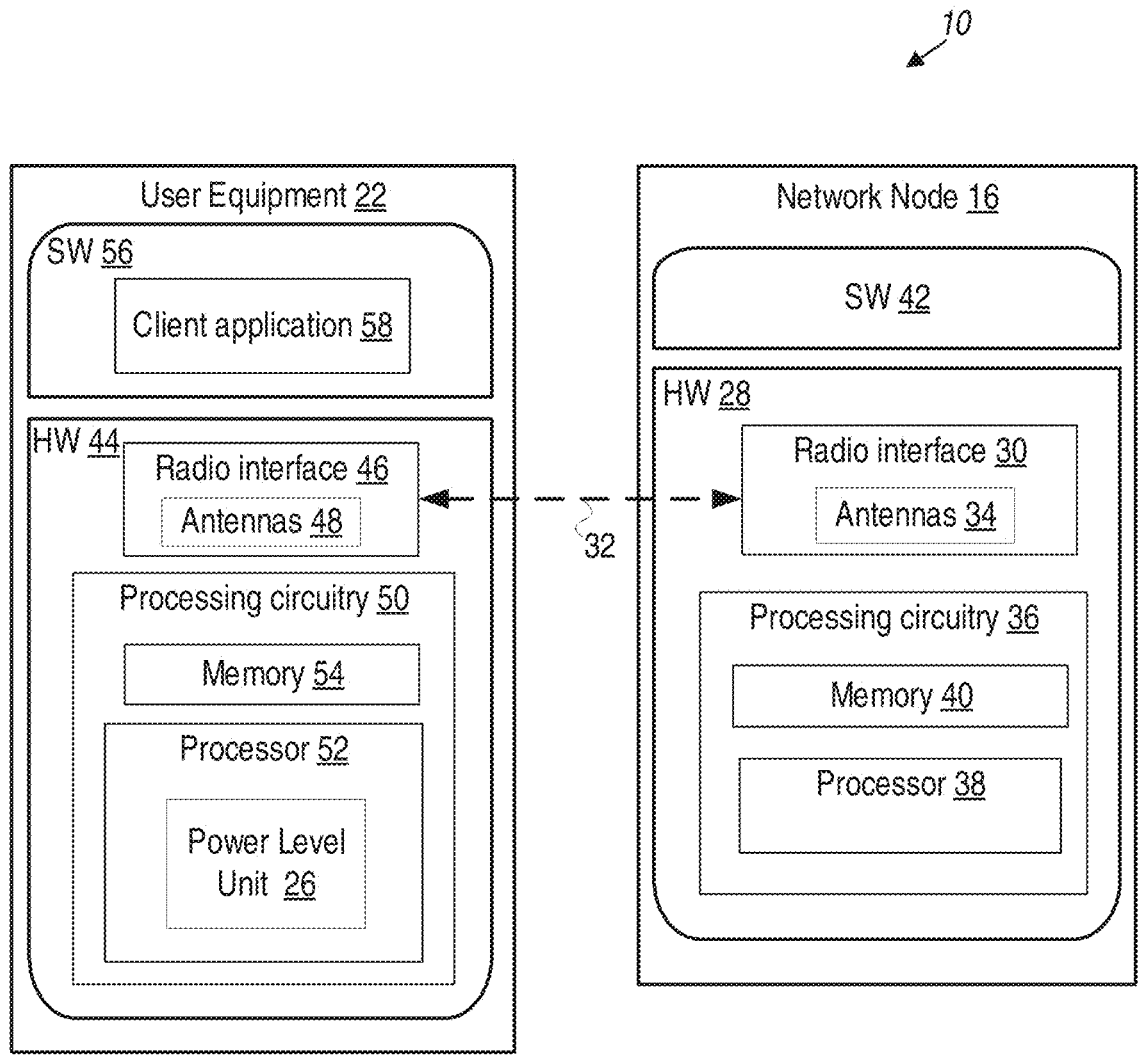
FIG. 4 is a block diagram of a network node in communication with a user equipment over a wireless connection according to some embodiments of the present disclosure.

In some embodiments, the inner workings of the network node 16 and UE 22 may be as shown in FIG. 4 and independently, the surrounding network topology may be that of FIG. 3.

The wireless connection 32 between the UE 22 and the network node 16 is in accordance with the teachings of the embodiments described throughout this disclosure. More precisely, the teachings of some of these embodiments may improve the data rate, latency, and/or power consumption and thereby provide benefits such as reduced user waiting time, relaxed restriction on file size, better responsiveness, extended battery lifetime, etc. In some embodiments, a measurement procedure may be provided for the purpose of monitoring data rate, latency and other factors on which the one or more embodiments improve.

Although FIGS. 3 and 4 show various power level unit 26 as being within a respective processor, it is contemplated that these units may be implemented such that a portion of the unit is stored in a corresponding memory within the processing circuitry. In other words, the units may be implemented in hardware or in a combination of hardware and software within the processing circuitry.

Figure 5:
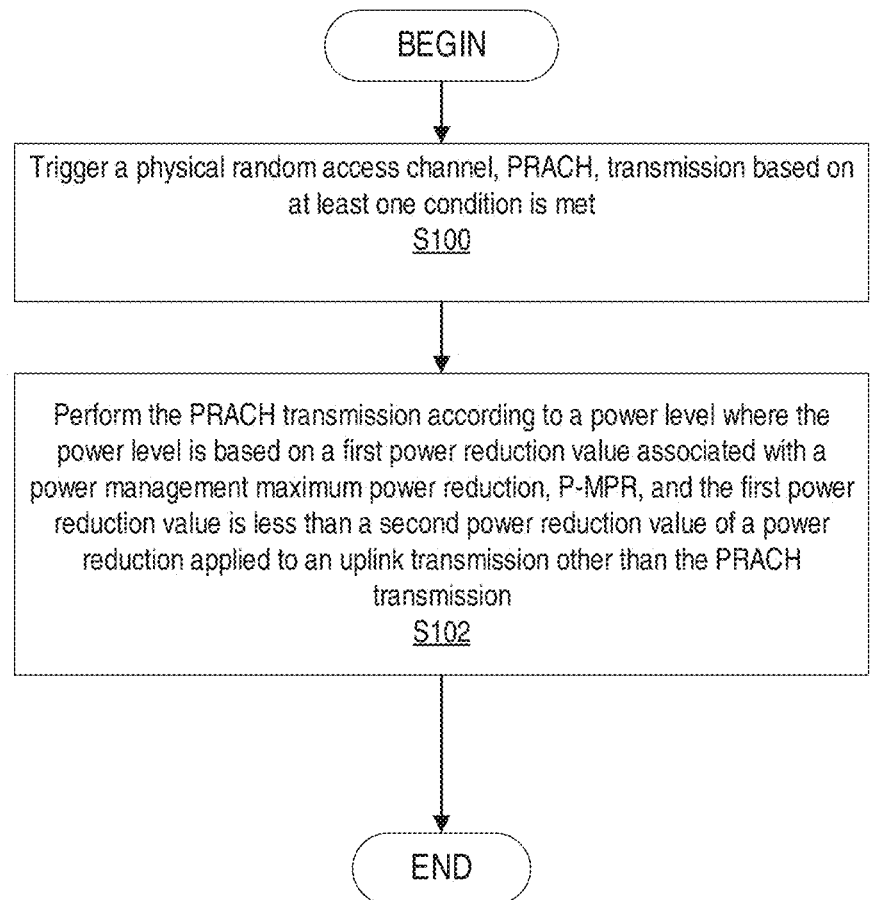
FIG. 5 is a flowchart of an example process in a user equipment according to some embodiments of the present disclosure.

FIG. 5 is a flowchart of an example process in a user equipment 22 according to some embodiments of the present disclosure. One or more blocks described herein may be performed by one or more elements of user equipment 22 such as by one or more of processing circuitry 50 (including the power level unit 26), processor 52, and/or radio interface 46. UE 22 such as via processing circuitry 50 and/or processor 52 and/or radio interface 46 is configured to trigger (Block S100) a physical random access channel, PRACH, transmission based on at least one condition is met, as described herein. UE 22 is configured to perform (Block S102) the PRACH transmission according to a power level, where the power level is based on a first power reduction value associated with a power management maximum power reduction, P-MPR, and the first power reduction value is less than a second power reduction value of a power reduction applied to an uplink transmission other than the PRACH transmission, as described herein.

According to one or more embodiments, the UE 22 is further configured to report a power headroom report, PHR, indicating the second power reduction value to the uplink transmission other than the PRACH transmission.

According to one or more embodiments, the UE 22 is further configured to report the second power reduction of the uplink transmission other than the PRACH transmission using at least one of: delta_P value and P-bit value.

According to one or more embodiments, the first power reduction value is a zero value, and the power level of the PRACH transmission corresponds to a first maximum transmission power level for the UE 22.

According to one or more embodiments, the first power reduction value is configured to cause the PRACH transmission to comply with at least one predefined electromagnetic power density exposure requirement.

According to one or more embodiments, the power level of the PRACH transmission corresponds to a first maximum transmission power level minus the first power reduction value.

According to one or more embodiments, the first power reduction value is configured to cause the PRACH transmission to meet a predefined total exposure ratio, TER, requirement associated with electromagnetic exposure from the UE 22.

According to one or more embodiments, the at least one condition comprises at least one of: a beam failure recovery condition, establishment of Frequency Range (FR) 1 and FR2 carrier aggregation, and a scheduling of more uplink subframes than downlink subframes.

According to one or more embodiments, the first power reduction value for PRACH transmission is based on a coexistence of two radio access technologies, RATs, used by the UE 22.

Having described the general process flow of arrangements of the disclosure and having provided examples of hardware and software arrangements for implementing the processes and functions of the disclosure, the sections below provide details and examples of arrangements for power management for transmissions.

Some embodiments provide power management for transmissions, e.g., PRACH transmissions.

One or more embodiments relate to one or more methods for a UE 22 that is configured to communicate with a network node 16, the method comprises:
  triggering a PRACH transmission to the network node 16,
    applying a power level to the PRACH transmission with a first maximum transmission power,
      wherein the first maximum transmission power is applied with a first power reduction for power management,
        depending on i) an event that triggered the PRACH transmission, and/or ii) a configuration obtained at the wireless device, and/or iii) a channel condition.
  when there are other UL transmissions than PRACH,
    applying a power level to the other UL transmissions with a second maximum transmission power,
      wherein the second maximum transmission power is applied with a second power reduction for power management,
  wherein the first power reduction for power management is 0 or smaller than the second power reduction for power management.

According to one or more embodiments, when there are other UL transmissions other than PRACH, the method comprises:
  reporting a power headroom report (PHR), wherein the PHR comprises at least one of the following,
    Pc_max;
    P bit;
    MPE/P-MPR; and
    Delta_P.
  wherein the second maximum transmission power with the second power reduction for power management applied to the other UL transmission is indicated in the PHR.

According to one or more embodiments, when the UE 22 applies power reduction for power management, it can be for one or more of the reasons below:
  ensuring compliance with applicable electromagnetic energy absorption requirements and addressing unwanted emissions/self desense requirements in case of simultaneous transmissions on multiple RAT(s) for scenarios not in scope of 3GPP RAN specifications
  ensuring compliance with applicable electromagnetic energy absorption requirements in case of proximity detection is used to address such requirements that require a lower maximum output power.
  any thermal limitation
  power saving According to one or more embodiments, the event that triggers the PRACH transmission is at least one of the following:
  a failure event;
  a mobility event;
  a timing related event;
  a data arrival or request event; and
  an RRC connection event.

According to one or more embodiments, the configuration obtained at the UE 22 is at least one of the following.
  PRACH configurations;
  Operating frequency; and
  L1 configurations.

According to one or more embodiments, the channel condition is at least one of the following.
  signal strength with or without interference;
  coexistence with other technologies; and
  pathloss estimate.

Figure 6:
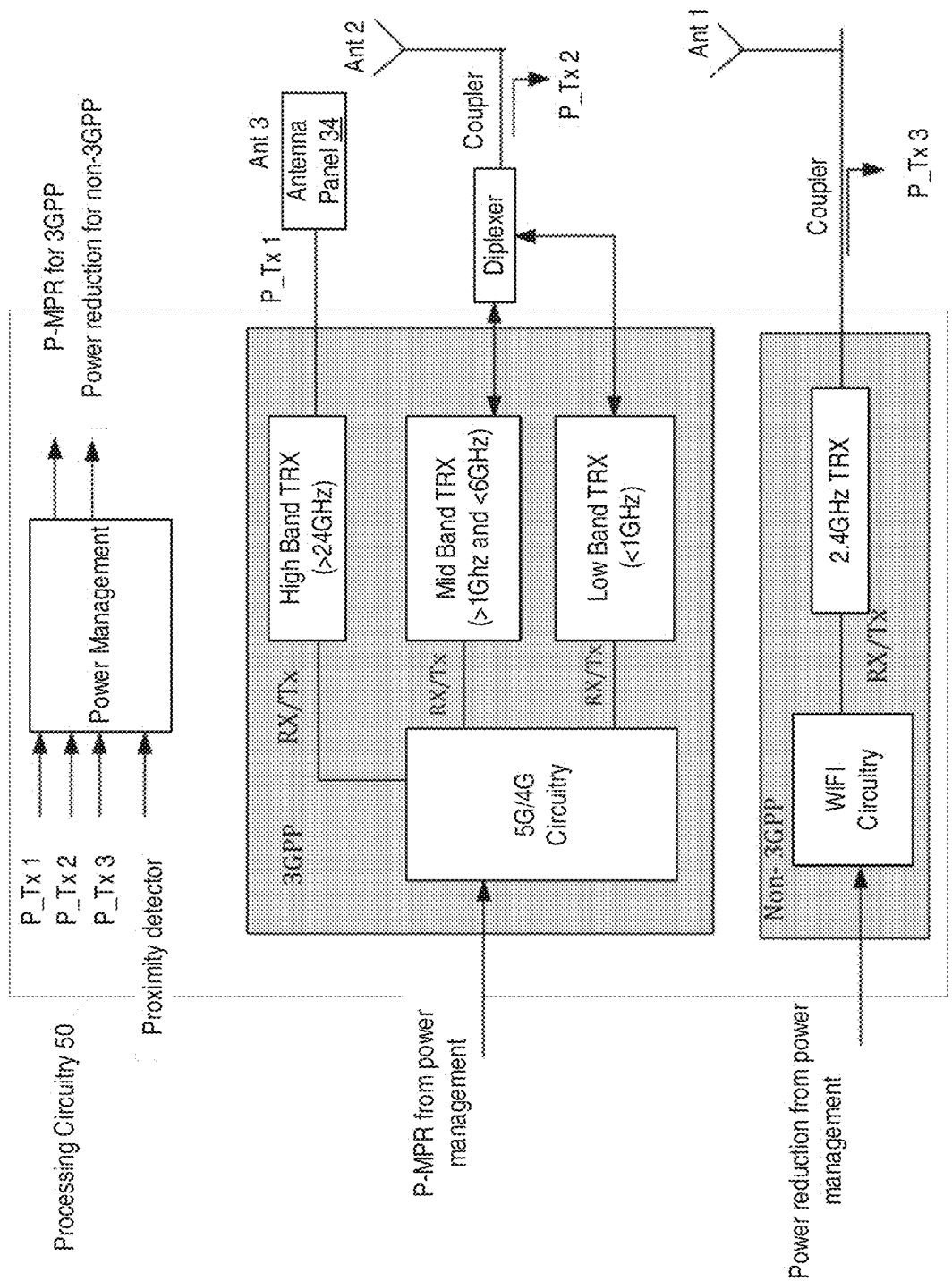
FIG. 6 is a block diagram of power management according to some embodiments of the present disclosure.

Further, to meet the SAR or power density exposure requirements, the power management block illustrated in FIG. 6 may have several output power level inputs from different radio technologies, including the 3GPP 4G/5G/6G transmitters and/or non-3GPP technologies, e.g., the WIFI. UE 22 may sum the different output power from the front-end modules together in one fixed interval time and compare to a threshold to determine whether the total output power will be below the SAR limit with a certain averaging time (e.g., $6s$). The power level input to the power management block may be the measured power before the antenna with a coupler from different transceivers as illustrated in FIG. 6. The different transceivers are either operating on different frequency ranges or operating with different technologies. The transmission power level may be indicated by other means from a 3GPP modem or a WIFI modem, e.g., when the power management block is implemented within a 3GPP modem or a WIFI modem, these output power levels could be indicated within the modem. In case the total output power exceeds the threshold, a power reduction indication may be sent to the 3GPP 4G/5G/6G modem to start reducing the transmission power. Such an indication can be P-MPR indication to 6G or 5G or 4G cell depending on its current transmission power.

Figure 7:
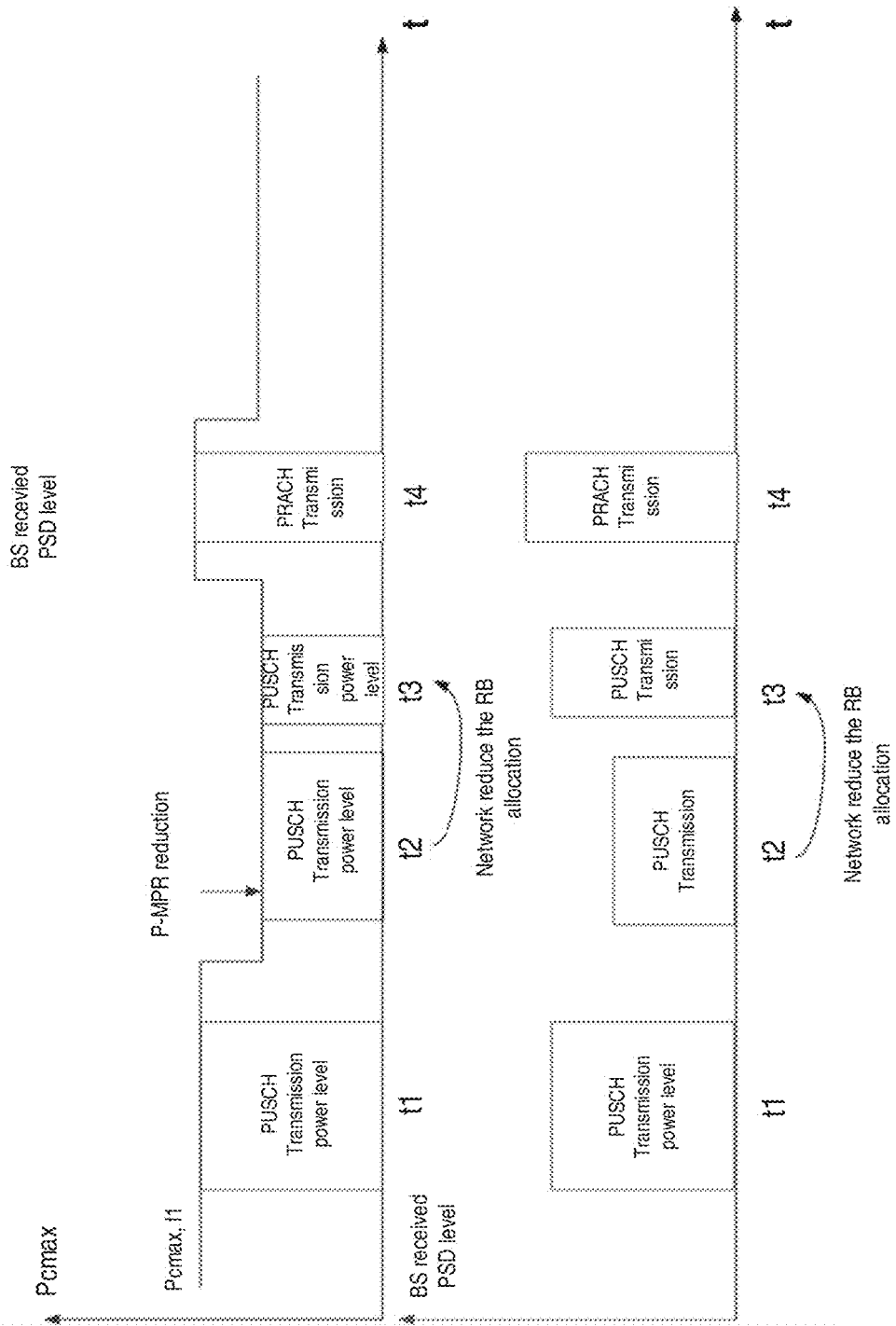
FIG. 7 is a diagram of network node received power spectral density level for different channels with or without P-MPR reduction setting on UE transmission power.

In one or more embodiments, in case the P-MPR could be applied to any of the cell(s) in 3GPP transceiver(s) to reduce the total transmission power from UE 22, UE 22 may set the P-MPR to the transmission power of this Cell so the maximum transmission power for one or more transmissions (e.g., PUSCH/PUCCH/SRS) in this cell would be reduced with an amount of P-MPR. When UE 22 transmits the PRACH in the Cell, the output power level of the PRACH may not be reduced as the other channel transmission (e.g., PUSCH/PUCCH) so that the PRACH coverage will not be reduced at the network. For example, as illustrated in FIG. 7, UE 22 transmits the PUSCH at t1 with its maximum transmission power Pcmax, and, at t2, UE 22 applies the P-MPR to reduce the output power by P-MPR. At the network side (e.g., network node 16 side), the received PSD will be lowered with P-MPR and therefore, the network may schedule with less RB(s) for PUSCH to keep the similar or same PSD level as t1. At t4, when UE 22 starts to transmit PRACH, in this case, UE 22 could not apply the P-MPR for PRACH transmission, the reason is that the PRACH transmission may occur only once (single PRACH) if the PRACH signal would be received at network node 16 and therefore, UE average transmission power within certain time period may still be below the threshold to meet the SAR absorption rate or power density exposure requirement. If the PRACH is not received successfully at network node 16, as the percentage of the PRACH occasions during a certain period (e.g., 10 ms) could be low (e.g., for PRACH configuration 127, the Percentage of PRACH occasions within 10 ms is 13% for a time division duplexing (TDD) pattern of the 7DS8U for 120 kHz subcarrier spacing (SCS) for FR2 band), UE 22 can still meet the SAR and power density exposure requirements.

According to one or more embodiments, P-MPR is one way of power management for exposure compliance, which may be equivalent to the power reduction for power management as used herein. P-MPR (MPE P-MPR) may be defined as follows:
  MPE P-MPR: the power backoff to meet the MPE FR2 requirements for a Serving Cell operating on FR2;

According to one or more embodiments, Delta_P to change the power class is one way of power management for exposure compliance, which may be equivalent to the power reduction for power management as used herein.

According to one or more embodiments, the delta_P is the same as DPC (e.g., downlink power control), or DPC_BC as defined in 3GPP TS 38.321 as follows:
DPC: the adjustment to maximum output power for a given power class for a Serving Cell operating on FR1;
$DPC_{BC}$: the adjustment to maximum output power for a given power class for a Band Combination operating on FR1.

According to one or more embodiments, when the first power reduction for power management is 0, it's equivalent to UE 22 applying the maximum transmission power without additional power backoff.

According to one or more embodiments, the power level applied to the PRACH transmission by UE 22 is higher than the power level applied to the other UL transmissions.

According to one or more embodiments, the first maximum transmission power is the same as the second maximum transmission power.

According to one or more embodiments, the first maximum transmission power is the Pcmax,f,c calculated for the PRACH transmissions.

According to one or more embodiments, the second maximum transmission power is the Pcmax,f,c calculated for the other UL transmissions.

According to one or more embodiments, the first maximum transmission power is less than the second maximum transmission power.

According to one or more embodiments, the first and second maximum transmission power is Pcmax,f,c per transmission occasion defined in 3GPP TS 38.213.

According to one or more embodiments, the second power reduction for power management is indicated by MPE/P-MPR or delta_P.

One or more embodiments described herein apply to one or more of UE FR1, FR2-1 or FR2-2, standalone or non-standalone or MR-DC (e.g., multi-RAT dual connectivity) or CA/DC (e.g., carrier aggregation/dual connectivity).

According to one or more embodiments, the other UL transmissions comprise at least one of the following:
physical uplink shared channel (PUSCH)
physical uplink control channel (PUCCH)
sounding reference signal (SRS)

According to one or more embodiments, the second power reduction for power management is independent of the first power reduction for power management. For example, even when both first and second power reductions for power management are both zero, it could be due to a large duty cycle supported by the UE side which is larger than the P-MPR, which means no P-MPR is applied.

According to one or more embodiments, the P bit=1 is reported under FR1 for the other UL transmissions than PRACH, and the first maximum transmission power applied to the PRACH transmission is without the P-MPR power backoff or with a smaller than P-MPR power backoff.

According to one or more embodiments, the delta_P>0 is reported under FR1 for the other UL transmissions than PRACH, and the first maximum transmission power applied to the PRACH transmission is without the delta_P power backoff or with a smaller than the delta_P power backoff.

According to one or more embodiments, when mpe-Reporting-FR2 is configured, the P bit>0 is reported under FR2 for other UL transmissions other than PRACH, and the first maximum transmission power applied to the PRACH transmission is without the P-MPR power backoff or with a smaller than P-MPR power backoff.

According to one or more embodiments, the first maximum transmission power applied to the PRACH transmission when the P bit=1 is reported under FR1 for other UL transmissions other than PRACH is the same as the first maximum transmission power applied to the PRACH transmission when the P bit-0 is reported under FR1 for the other UL transmissions.

According to one of the main embodiments, wherein the first maximum transmission power applied to the PRACH transmission when the delta_P>0 is reported under FR1 for the other UL transmissions other than PRACH is the same as first maximum transmission power applied to the PRACH transmission when the delta_P=0 is reported under FR2 for the other UL transmissions.

According to one or more embodiments, the first maximum transmission power applied to the PRACH transmissions when the P bit>0 is reported under FR2 for the other UL transmissions other than PRACH is the same as the first maximum transmission power applied to the PRACH transmissions when the P bit=0 is reported under FR2 for the other UL transmissions.

According to one of the main embodiments, wherein the UE is in an RRC_Connected state when reporting PHR.

According to one or more embodiments, the event that triggers the PRACH transmission comprises at least one of the following:
A failure event;
A mobility event;
A timing related event;
A data arrival or request event; and
A RRC connection event.

According to one or more embodiments, the configuration obtained at the UE 22 comprises at least one of the following configurations:
PRACH configurations;
Operating frequency; and
L1 configurations.

According to one or more embodiments, the channel condition comprises at least one of the following conditions:
Signal strength with or without interference; and
Coexistence with other technologies.

According to one or more embodiments, the failure event comprises one or more of the following:
A SR failure
A failure leading to an radio resource control (RRC) Reestablishment procedure, such as one or more of:
Radio Link Failure (RLF) (e.g., expiry of timer T310);
Reconfiguration with sync failure (e.g., expiry of timer T304);
Integrity check failure (e.g. indication from lower layers);
RRC connection configuration failure (e.g. inability to comply with configuration(s));
A failure in a cell group leading to a failure report in another cell group, such as one or more of:
An master cell group (MCG) RLF while a secondary cell group (SCG) is configured, leading to an MCG failure report to the SCG;
An SCG RLF while an MCG is configured, leading to an SCG failure report to the MCG;
A failure leading to a Beam Failure Recovery procedure, such as a Beam Failure Detection;
A failure leading to a Mobility procedure, such as one or more of the following:
An RLF or reconfiguration with sync failure leading to a Conditional Handover (CHO) execution, when the selected cell during reestablishment is a cell for which the UE 22 has a stored CHO configuration;

An radio link failure (RLF) or location tracking management (LTM) cell switch failure leads leading to an LTM Cell switch, when the selected cell during reestablishment is a cell for which the UE 22 has a stored LTM configuration;

An RRC related failure, e.g., inability to comply with an RRC configuration/RRC message.

A L1/L2 related failure, e.g., a number of out of sync indications from lower layers to higher layers.

Consistent UL listen before talk (LBT) failure on SpCell;

According to one or more embodiments, the mobility event is the request by RRC upon synchronous reconfiguration, which comprises one or more of:

Initial access from RRC_IDLE;
Conditional Handover (CHO) execution;
Conditional PSCell Change (CPC) execution;
Conditional PSCell Addition (CPA) execution;
An LTM Cell Switch;
A Handover;
A PSCell Change execution; and
A PSCell Addition execution.

According to one or more embodiments, the data arrival or request event comprises one or more of the following:

DL or UL data arrival, during RRC_CONNECTED or during RRC_INACTIVE while SDT procedure is ongoing, when UL synchronisation status is "non-synchronised";

UL data arrival, during RRC_CONNECTED or during RRC_INACTIVE while SDT procedure is ongoing, when there are no PUCCH resources for SR available;

SDT in RRC_INACTIVE; and
Request for Other SI.

According to one or more embodiments, the timing related event comprises one or more of the following:

To establish time alignment for a secondary TAG; and
Positioning purpose during RRC_CONNECTED requiring random access procedure, e.g., when timing advance is needed for UE positioning.

According to one or more embodiments, the RRC connection related event comprises one or more of the following:

RRC Connection Re-establishment procedure; and
RRC Connection Resume procedure from RRC_INACTIVE;

According to one or more embodiments, the PRACH configuration comprises one or more of the following:

Number of the PRACH transmission(s);
PRACH repetition;
RACH type, e.g., Two step RACH or Four step RACH, contention-based RACH or non-contention based RACH, etc.;
PRACH retransmission; and
SSB RSRP thresholds for multiple PRACH transmissions.

PRACH Events, Configuration and Channel Condition
PRACH Triggering Events

According to one or more embodiments, the event that triggers the PRACH transmission comprises at least one of the following:

A failure event;
A mobility event;
A timing related event;
A data arrival or request event; and
A RRC connection event.

According to one or more embodiments, the failure event comprises one or more of:

A SR failure;
A failure leading to an RRC Reestablishment procedure, such as one or more of:
Radio Link Failure (RLF) (e.g. expiry of timer T310);
Reconfiguration with sync failure (e.g. expiry of timer T304);
Integrity check failure (e.g. indication from lower layers);
RRC connection configuration failure (e.g. inability to comply with configuration(s));
A failure in a cell group leading to a failure report in another cell group, such as one or more of the following:
An MCG RLF while an SCG is configured, leading to an MCG failure report to the SCG; and
An SCG RLF while an MCG is configured, leading to an SCG failure report to the MCG;
A failure leading to a Beam Failure Recovery procedure, such as a Beam Failure Detection;
A failure leading to a Mobility procedure, such as one or more of the following:
An RLF or reconfiguration with sync failure leading to a Conditional Handover (CHO) execution, when the selected cell during reestablishment is a cell for which the UE 22 has a stored CHO configuration; and
An RLF or LTM cell switch failure leads to an LTM Cell switch, when the selected cell during reestablishment is a cell for which the UE 22 has a stored LTM configuration;
An RRC related failure, e.g., inability to comply with an RRC configuration/RRC message;
A L1/L2 related failure, e.g., a number of out of sync indications from lower layers to higher layers; and
Consistent UL LBT failure on SpCell.

According to one or more embodiments, the mobility event is the request by RRC upon synchronous reconfiguration, which comprises one or more of:

Initial access from RRC_IDLE;
Conditional Handover (CHO) execution;
Conditional PSCell Change (CPC) execution;
Conditional PSCell Addition (CPA) execution;
An LTM Cell Switch;
A Handover;
A PSCell Change execution; and
A PSCell Addition execution.

According to one or more embodiments, the data arrival or request event comprises one or more of the following:

DL or UL data arrival, during RRC_CONNECTED or during RRC_INACTIVE while SDT procedure is ongoing, when UL synchronisation status is "non-synchronised";

UL data arrival, during RRC_CONNECTED or during RRC_INACTIVE while SDT procedure is ongoing, when there are no PUCCH resources for SR available;

SDT in RRC_INACTIVE;
Request for Other SI
For example, for UEs 22 in RRC_IDLE and RRC_INACTIVE while SDT procedure is not ongoing or active, a request for other SI triggers a random access procedure where MSG3 (e.g., message 3) includes the SI request message unless the requested SI is associated with a subset of the PRACH resources, in which case MSG1 (e.g., message 1) is used for indication of the requested other SI.

According to one or more embodiments, the timing related event comprises one or more of the following:
  To establish time alignment for a secondary TAG; and
  Positioning purpose during RRC_CONNECTED requiring random access procedure, e.g., when timing advance is needed for UE positioning.

Configurations Obtained by the UE 22

According to one or more embodiments, the configuration corresponds to at least one of the following conditions:
  PRACH configurations;
  Operating frequency;
    In one or more embodiments, UE 22 may consider applying the maximum transmission power level without additional P-MPR/delta_P power backoff or with a smaller backoff than P-MPR/delta_P backoff than delta_P to the PRACH transmission depending on the operating frequency such as frequency range, frequency bands, etc.
    For example, for FR1, UE 22 could apply the PRACH power level without additional P-MPR power backoff even when P bit=1 is reported in PHR for the other UL transmissions such as PUSCH/PUCCH/SRS with additional P-MPR power backoff.
      The advantage of applying such power level without additional P-MPR power backoff on PRACH for FR1 is to provide a power distribution for PRACH channels and other UL transmissions, where the PRACH is prioritized by higher power spectral density while the SAR/MPE requirements can still be met.
    Another example, for FR1, UE 22 could apply the PRACH power level with a smaller backoff than delta_P even when delta_P>0 is reported in PHR for the other UL transmissions such as PUSCH/PUCCH/SRS is changed according to the power class change. When delta_P>0 is reported it means the power level applied to PUSCH/PUCCH/SRS is changed according to the power class change.
      One advantage of applying such power level with a smaller backoff than P-MPR on PRACH for FR2 is to provide a power distribution for PRACH channels and other UL transmissions, where the PRACH is prioritized by higher power spectral density while the SAR/MPE requirements can still be met.
    Another example, for FR2, when mpe-Reporting-FR2 is configured, UE 22 could apply the PRACH power level with a smaller backoff than P-MPR even when P bit>0 is reported in PHR for the other UL transmissions such as PUSCH/PUCCH/SRS with additional P-MPR power backoff. When P bit is reported as being greater than 0 it means the P-MPR is applied and P-MPR is also reported in PHR so the PUSCH/PUCCH/SRS may apply a higher P-MPR backoff by reporting the P-MPR values as indicated in the following table, e.g., Table 10. 1.26.1-1 from 3GPP TS 38.321, v.17.6.0.

TABLE 10.1.26.1-1

Mapping of FR2 P-MPR

| Reported value | Measured quantity value | Unit |
| --- | --- | --- |
| P-MPR_00 | 3 < PMP-R < 6 | dB |
| P-MPR_01 | 6 < PMP-R < 9 | dB |

TABLE 10.1.26.1-1-continued

Mapping of FR2 P-MPR

| Reported value | Measured quantity value | Unit |
| --- | --- | --- |
| P-MPR_02 | 9 < PMP-R < 12 | dB |
| P-MPR_03 | PMP-R ≥ 12 | dB |

One advantage of applying such power level with a smaller backoff than P-MPR on PRACH for FR2 is to provide a power distribution for PRACH channels and other UL transmissions, where the PRACH is prioritized by higher power spectral density while the SAR/MPE requirements can still be met.
  L1 configurations
    In one or more embodiments, UE 22 may consider applying the maximum transmission power level without additional P-MPR/delta_P power backoff or with a smaller backoff than P-MPR/delta_P backoff than delta_P to the PRACH transmission depending on the L1 configurations such as UL/DL configurations.
    For example, UE 22 may consider applying the PRACH power level without additional P-MPR power backoff depending on the UL/DL configuration, e.g., when there is UL heavy configuration as the UL/DL distribution for the physical resource in time, where the "UL heavy" means there are more UL subframes than the DL subframes within one radio frame. For FR1, UE 22 could apply the PRACH power level without additional P-MPR power backoff even when P bit=1 is reported in PHR for the other UL transmissions such as PUSCH/PUCCH/SRS with additional P-MPR power backoff.
    Another example, UE 22 may consider applying the PRACH power level with a smaller backoff than P-MPR depending on the UL/DL configuration, e.g., when there is UL heavy configuration as the UL/DL distribution for the physical resource in time, where the "UL heavy" means there are more UL subframes than the DL subframes within one radio frame. For FR1, UE 22 could apply the PRACH power level with a smaller backoff than delta_P even when delta_P>0 is reported in PHR for the other UL transmissions such as PUSCH/PUCCH/SRS is changed according to the power class change.
    Another example, UE 22 may apply the PRACH power level with a smaller backoff than P-MPR depending on the UL/DL configuration, e.g., when there is UL heavy configuration as the UL/DL distribution for the physical resource in time, where the "UL heavy" means there are more UL subframes than the DL subframes within one radio frame. for FR2, the UE 22 could apply the PRACH power level with a smaller backoff than P-MPR even when P bit>0 is reported in PHR for the other UL transmissions such as PUSCH/PUCCH/SRS with additional P-MPR power backoff.
      The advantage of applying such power level without additional P-MPR power backoff on PRACH when there is a heavy UL transmission condition is to provide a UE implementation solution to ensure a practical power distribution for PRACH channels and other UL transmissions, where the PRACH is prioritized by higher power spectral density to be robust under the low signal strength condition while the SAR/MPE requirements can still be met.

In one or more embodiments, UE 22 may consider applying the maximum transmission power level without additional P-MPR/delta_P power backoff or with a smaller backoff than P-MPR/delta_P backoff than delta_P to the PRACH transmission depending on the L1 configurations such as number of physical resource block (PRB) allocated for PUSCH.

For example, UE 22 may consider applying the PRACH power level without additional P-MPR power backoff depending on the number of PRB allocated for PUSCH, e.g., when there is full bandwidth allocated to PUSCH in frequency. For FR1, UE 22 could apply the PRACH power level without additional P-MPR power backoff even when P bit=1 is reported in PHR for the other UL transmissions such as PUSCH/PUCCH/SRS with additional P-MPR power backoff.

Another example, UE 22 may consider applying the PRACH power level with a smaller backoff than P-MPR depending on the number of PRB allocated for PUSCH, e.g., when there is full bandwidth allocated to PUSCH in frequency. For FR1, UE 22 could apply the PRACH power level with a smaller backoff than delta_P even when delta_P>0 is reported in PHR for the other UL transmissions such as PUSCH/PUCCH/SRS is changed according to the power class change.

In another example, UE 22 may apply the PRACH power level with a smaller backoff than P-MPR depending on the number of PRB allocated for PUSCH, e.g., when there is full bandwidth allocated to PUSCH in frequency. For FR2, UE 22 may apply the PRACH power level with a smaller backoff than P-MPR even when P bit>0 is reported in PHR for the other UL transmissions such as PUSCH/PUCCH/SRS with additional P-MPR power backoff.

One advantage of applying such a power level without additional P-MPR power backoff on PRACH when there is full bandwidth allocated to PUSCH in frequency is to provide a UE implementation solution to ensure a practical power distribution for PRACH channels and other UL transmissions, where the PRACH is prioritized by higher power spectral density to be robust under the low signal strength condition while the SAR/MPE requirements can still be met.

According to one or more embodiments, the PRACH configuration comprises to one or more of the following:

Number of the PRACH transmission(s)

In one or more embodiments, UE 22 may apply the maximum transmission power level without additional P-MPR/delta_P power backoff or with a smaller backoff than P-MPR/delta_P backoff than delta_P to the PRACH transmission depending on the number of PRACH transmissions.

For example, UE 22 may apply the PRACH power level without additional P-MPR power backoff or with a smaller backoff than P-MPR when the number of PRACH transmission is larger than a threshold, which means the PRACH transmission may require a robustness under this condition. For FR1, UE 22 may apply the PRACH power level without additional P-MPR power backoff even when P bit=1 is reported in PHR for the other UL transmissions such as PUSCH/PUCCH/SRS with additional P-MPR power backoff. For FR1, UE 22 may apply the PRACH power level with a smaller backoff delta_P even when delta_P>0 is reported in PHR for the other UL transmissions such as PUSCH/PUCCH/SRS is changed according to the power class change. For FR2, UE 22 may apply the PRACH power level with a smaller backoff than P-MPR even when P bit>0 is reported in PHR for the other UL transmissions such as PUSCH/PUCCH/SRS with additional P-MPR power backoff.

RACH type, e.g., Two step RACH or Four step RACH, contention-based RACH or non-contention based RACH, etc.

According to one or more embodiments, UE 22 may apply the maximum transmission power level without additional P-MPR/delta_P power backoff or with a smaller backoff than P-MPR/delta_P backoff than delta_P to the PRACH transmission depending on the RACH type, e.g., Two step RACH or Four step RACH, contention-based RACH or non-contention based RACH.

For example, UE 22 may apply the PRACH power level without additional P-MPR power backoff or with a smaller backoff than P-MPR depending on the RACH type, e.g., non-contention based or two step RACH, which means the PRACH transmission may require robustness under this condition. For FR1, UE 22 may apply the PRACH power level without additional P-MPR power backoff even when P bit=1 is reported in PHR for the other UL transmissions such as PUSCH/PUCCH/SRS with additional P-MPR power backoff. For FR1, UE 22 could apply the PRACH power level with a smaller backoff than delta_P even when delta_P>0 is reported in PHR for the other UL transmissions such as PUSCH/PUCCH/SRS is changed according to the power class change. For FR2, UE 22 could apply the PRACH power level with a smaller backoff than P-MPR even when P bit>0 is reported in PHR for the other UL transmissions such as PUSCH/PUCCH/SRS with additional P-MPR power backoff.

PRACH retransmission

According to one or more embodiments, UE 22 may apply the maximum transmission power level without additional P-MPR/delta_P power backoff or with a smaller backoff than P-MPR/delta_P backoff than delta_P to the PRACH transmission depending on the PRACH retransmission.

For example, UE 22 may apply the PRACH power level without additional P-MPR power backoff or with a smaller backoff than P-MPR when PRACH is under retransmission, which means the PRACH transmission may require robustness under this condition. For FR1, UE 22 may apply the PRACH power level without additional P-MPR power backoff even when P bit=1 is reported in PHR for the other UL transmissions such as PUSCH/PUCCH/SRS with additional P-MPR power backoff. For FR2, UE 22 may apply the PRACH power level with a smaller backoff than delta_P even when delta_P>0 is reported in PHR for the other UL transmissions such as PUSCH/PUCCH/SRS is changed according to the power class change. For FR2, UE 22 may apply the PRACH power level with a smaller backoff than P-MPR even when P bit>0 is reported in PHR for the other UL transmissions such as PUSCH/ PUCCH/SRS with additional P-MPR power backoff.

PRACH repetition

According to one or more embodiments, UE 22 may apply the maximum transmission power level without additional P-MPR/delta_P power backoff or with a smaller backoff than P-MPR/delta_P backoff than delta_P to the PRACH transmission depending on the number of PRACH repetitions.

For example, UE 22 may apply the PRACH power level without additional P-MPR power backoff or with a smaller backoff than P-MPR when the number of PRACH repetitions is larger than a threshold, which means the PRACH transmission may require robustness under this condition. For FR1, UE 22 may apply the PRACH power level without additional P-MPR power backoff even when P bit=1 is reported in PHR for the other UL transmissions such as PUSCH/PUCCH/SRS with additional P-MPR power backoff. For FR1, UE 22 may apply the PRACH power level with a smaller backoff than delta_P even when delta_P>0 is reported in PHR for the other UL transmissions such as PUSCH/PUCCH/SRS is changed according to the power class change. For FR2, UE 22 may apply the PRACH power level with a smaller backoff than P-MPR even when P bit>0 is reported in PHR for the other UL transmissions such as PUSCH/PUCCH/SRS with additional P-MPR power backoff.

Channel Conditions

According to one or more embodiments, the channel condition corresponds to at least one of the following conditions:

Signal strength with or without interference;

According to one or more embodiments, UE 22 may apply the maximum transmission power level without additional P-MPR/delta_P power backoff or with a smaller backoff than P-MPR/delta_P backoff than delta_P to the PRACH transmission depending on the signal strength with or without interference such as SNR/SINR/RSRP/RSRQ/CSI/SSB RSRP/RSRQ or pathloss estimate.

For example, for FR1, when the signal strength is lower than a threshold, UE 22 may apply the PRACH power level without additional P-MPR power backoff even when P bit=1 is reported in PHR for the other UL transmissions such as PUSCH/PUCCH/SRS with additional P-MPR power backoff.

One advantage of applying such power level without additional P-MPR power backoff on PRACH when there is low signal strength condition is to provide a clear UE implementation solution to ensure a practical power distribution for PRACH channels and other UL transmissions, where the PRACH is prioritized by higher power spectral density to be robust under the low signal strength condition while the SAR/MPE requirements can still be met.

Another example, for FR1, when the signal strength is lower than a threshold, UE 22 may apply the PRACH power level with a smaller backoff than delta_P even when delta_P>0 is reported in PHR for the other UL transmissions such as PUSCH/PUCCH/SRS with additional delta_P power backoff. When delta_P>0 is reported it means the power level applied to PUSCH/PUCCH/SRS is changed according to the power class change.

One advantage of applying such power level without additional P-MPR power backoff on PRACH when there is low signal strength condition is to provide a UE implementation solution to ensure a practical power distribution for PRACH channels and other UL transmissions, where the PRACH is prioritized by higher power spectral density to be robust under the low signal strength condition while the SAR/MPE requirements can still be met.

In another example, for FR2, when the signal strength is lower than a threshold, UE 22 may apply the PRACH power level with a smaller backoff than P-MPR even when P bit>0 is reported in PHR for the other UL transmissions such as PUSCH/PUCCH/SRS with additional P-MPR power backoff. When P bit is reported as >0 it means the P-MPR is applied and P-MPR is also reported in PHR so the PUSCH/PUCCH/SRS may apply a higher P-MPR backoff by reporting the P-MPR values as indicated in the following table 10.1.26.1-1 of 3GPP TS 38.321, v17.6.0.

TABLE 10.1.26.1-1

Mapping of FR2 P-MPR

| Reported value | Measured quantity value | Unit |
|---|---|---|
| P-MPR_00 | 3 ≤ PMP-R < 6 | dB |
| P-MPR_01 | 6 ≤ PMP-R < 9 | dB |
| P-MPR_02 | 9 ≤ PMP-R < 12 | dB |
| P-MPR_03 | PMP-R ≥ 12 | dB |

One advantage of applying such power level without additional P-MPR power backoff on PRACH when there is low signal strength condition is to provide a UE implementation solution to ensure a practical power distribution for PRACH channels and other UL transmissions, where the PRACH is prioritized by higher power spectral density to be robust under the low signal strength condition while the SAR/MPE requirements can still be met.

Coexistence with other technologies

According to one or more embodiments, UE 22 may apply the maximum transmission power level without additional P-MPR/delta_P power backoff or with a smaller backoff than P-MPR/delta_P backoff than delta_P to the PRACH transmission depending on the coexistence with other technologies, such as Wi-Fi or Bluetooth, wherein the condition to consider the coexistence could further depend on the interference level from the other technologies and/or the time period when the coexistence with the other technologies exists.

For example, for FR1, when there is Wi-Fi coexistence issue with signal strength or interference level reaching certain threshold, UE 22 may apply the PRACH power level without additional P-MPR power backoff even when P bit=1 is reported in PHR for the other UL transmissions such as PUSCH/PUCCH/SRS with additional P-MPR power backoff.

The advantage of applying such power level without additional P-MPR power backoff on PRACH when there is coexistence issue with Wi-Fi is to provide a UE implementation solution to ensure a practical power distribution for PRACH channels and other UL transmissions, where the PRACH is prioritized by higher power spectral density to be robust under the coexistence interference while the SAR/MPE requirements can still be met.

In another example, for FR1, when there is Wi-Fi coexistence issue with signal strength or interference level reaching certain threshold, UE 22 may apply the PRACH power level with a smaller backoff than delta_P even when delta_P>0 is reported in PHR for the other UL transmissions such as PUSCH/PUCCH/SRS with additional P-MPR power backoff. When delta_P>0 is reported it means the power level applied to PUSCH/PUCCH/SRS is changed according to the power class change.

One advantage of applying such power level without additional P-MPR power backoff on PRACH when there is coexistence issue with Wi-Fi is to provide a UE implementation solution to ensure a practical power distribution for PRACH channels and other UL transmissions, where the PRACH is prioritized by higher power spectral density to be robust under the coexistence interference while the SAR/MPE requirements can still be met.

In another example, for FR2, when there is Wi-Fi coexistence issue with signal strength or interference level reaching certain threshold, UE 22 may apply the PRACH power level with a smaller backoff than P-MPR even when P bit>0 is reported in PHR for the other UL transmissions such as PUSCH/PUCCH/SRS with additional P-MPR power backoff. When P bit is reported as >0 it means the P-MPR is applied and P-MPR is also reported in PHR so the PUSCH/PUCCH/SRS may apply a higher P-MPR backoff by reporting the P-MPR values as indicated in the following table 10.1.26.1-1 of 3GPP 38.321,v17.6.0.

One advantage of applying such power level without additional P-MPR power backoff on PRACH when there is coexistence issue with Wi-Fi is to provide a UE implementation solution to ensure a practical power distribution for PRACH channels and other UL transmissions, where the PRACH is prioritized by higher power spectral density to be robust under the coexistence interference while the SAR/MPE requirements can still be met.

Some Examples

Example 1. A method implemented in a UE 22 that is configured to communicate with a network node, the method comprising:

triggering a PRACH transmission to the network node,

Applying a power level to the PRACH transmission with a first maximum transmission power, wherein the first maximum transmission power is applied with a first power management maximum output power reduction, ensuring compliance with applicable electromagnetic power density exposure requirements and addressing unwanted emissions/self desense requirements in case of simultaneous transmissions on multiple RAT(s) for scenarios not in scope of 3GPP RAN specifications, depending on i) an event that triggered the PRACH transmission, and/or ii) a configuration obtained at the wireless device, and/or iii) a channel condition.

when there are other UL transmissions other than PRACH,

Applying a power level to the other UL transmissions with a second maximum transmission power, wherein the second maximum transmission power is applied with a second power management maximum output power reduction, ensuring compliance with applicable electromagnetic power density exposure requirements and addressing unwanted emissions/self desense requirements in case of simultaneous transmissions on multiple RAT(s) for scenarios not in scope of 3GPP RAN specifications, wherein the first power management maximum output power reduction is 0 or smaller than the second power management maximum output power reduction.

Example 2. A method implemented in a UE 22 that is configured to communicate with a network node 16, the method comprising:

triggering a PRACH transmission to the network node, applying a power level to the PRACH transmission with a first maximum transmission power, wherein the first maximum transmission power is without any power back off (applied with a first power reduction for power management), depending on i) an event that triggered the PRACH transmission, and/or ii) a configuration obtained at the wireless device, and/or iii) a channel condition.

Example 3. The method according to Example 2, when there are other UL transmissions than PRACH, applying a power level to the other UL transmissions with a second maximum transmission power, wherein the second maximum transmission power is applied with a second power reduction for power management, Example 4. The method according to any one of Examples 2-3, wherein the first power reduction for power management is 0 or smaller than the second power reduction for power management.

Example 5. The method according to any one of Examples 1-4, when the PHR is triggered, reporting a power headroom report (PHR), wherein the PHR comprises at least one of the following, Pc_max P bit

MPE/P-MPR

Delta_P wherein the second maximum transmission power with the second power reduction for power management applied to the other UL transmission is indicated in the PHR.

Example 6. The method according to any one of Examples 1-5, wherein the power level applied to the PRACH transmission is higher than the power level applied to the other UL transmissions.

Example 7. The method according to any one of Examples 1-6, wherein the first maximum transmission power is the same as the second maximum transmission power.

Example 8. The method according to any one of Examples 1-7, wherein the first maximum transmission power is the Pc_max calculated for the PRACH transmissions.

Example 9. The method according to any one of Examples 1-7, wherein the second maximum transmission power is the Pc_max calculated for the other UL transmissions.

Example 10. The method according to any one of Examples 1-9, wherein the second power reduction for power management is indicated by MPE/P-MPR or delta_P.

Example 11. The method according to any one of Examples 1-10 applies to wireless device in FR1, FR2-1 or FR2-2, standalone or non-standalone or MR-DC or CA/DC.

Example 12. The method according to any one of Examples 1-10, wherein the P bit=1 is reported under FR1 for the other UL transmissions than PRACH, the first maximum transmission power applied to the PRACH transmission is without the P-MPR power backoff or with a smaller than P-MPR power backoff.

Example 13. The method according to any one of Examples 1-10, wherein the delta_P>0 is reported under FR1 for the other UL transmissions than PRACH, the first maximum transmission power applied to the PRACH transmission is without the delta_P power backoff or with a smaller than the delta_P power backoff.

Example 14. The method according to any one of Examples 1-10, wherein when mpe-Reporting-FR2 is configured, the P bit>0 is reported under FR2 for the other UL transmissions than PRACH, the first maximum transmission power applied to the PRACH transmission is without the P-MPR power backoff or with a smaller than P-MPR power backoff.

Example 15. The method according to Example 12, wherein the first maximum transmission power applied to the PRACH transmission when the P bit=1 is reported under FR1 for the other UL transmissions than PRACH is the same as the first maximum transmission power applied to the PRACH transmission when the P bit=0 is reported under FR1 for the other UL transmissions.

Example 16. The method according to Example 13, wherein the first maximum transmission power applied to the PRACH transmission when the delta_P>0 is reported under FR1 for the other UL transmissions than PRACH is the same as first maximum transmission power applied to the PRACH transmission when the delta_P=0 is reported under FR1 for the other UL transmissions.

Example 17. The method according to Example 14, wherein first maximum transmission power applied to the PRACH transmissions when the P bit>0 is reported under FR2 for the other UL transmissions than PRACH is the same as the first maximum transmission power applied to the PRACH transmissions when the P bit=0 is reported under FR2 for the other UL transmissions.

Example 18. The method according to any one of Examples 4-17, wherein the wireless device is in an RRC_Connected state when reporting PHR.

One or more embodiments described herein provide one or more of the following advantages.

One or more embodiments provide a practical UE implementation solution to apply power management on PRACH and other UL channels, and can be implemented by many existing legacy commercial UEs from 3GPP Rel-15.

One or more embodiments provide the UE implementation solutions on how to apply power allocation on PRACH, to ensure a stable connection in FR2 carriers, so the FR2 carriers in EN-DC or FR1+FR2 CA are not forced to be dropped or deprioritized due to a FR2 power limitation, so that this issue from the operator is addressed from UE side.

One or more embodiments provide a detailed UE implementation solution of how the PRACH can apply P-MPR, which will not depend on the maxUplinkDutyCycle capability, and therefore provides more flexibility on the optimization of the Uplink power control.

Further advantages are described herein for the different conditions and possible combinations.

As will be appreciated by one of skill in the art, the concepts described herein may be embodied as a method, data processing system, computer program product and/or computer storage media storing an executable computer program. Accordingly, the concepts described herein may take the form of an entirely hardware embodiment, an entirely software embodiment or an embodiment combining software and hardware aspects all generally referred to herein as a "circuit" or "module." Any process, step, action and/or functionality described herein may be performed by, and/or associated to, a corresponding module, which may be implemented in software and/or firmware and/or hardware. Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer (to thereby create a special purpose computer), special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Python, Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

Abbreviations that may be used in the preceding description include:

Abbreviation Explanation

CE Control Element
EN-DC E-UTRA NR Dual Connectivity with E-UTRA connected to EPC
MAC Media Access Control
MPE Maximum Permissible Exposure
MPE P-MPR the power backoff to meet the MPE FR2 requirements for a Serving Cell operating on FR2
MPR Allowed maximum power reduction
MR-DC Multi-Radio Dual Connectivity
PHR Power Headroom Reporting
P-MPR Power Management Maximum Power Reduction
PRACH Physical Random Access Channel
RRC Radio Resource Control
SRS Sounding Reference Signal
UE User Equipment
UL Uplink It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings.

What is claimed is:

1. A method implemented in a user equipment (UE) the method comprising:
   triggering a physical random access channel (PRACH) transmission based on at least one condition being met, wherein the at least one condition comprises at least one of: a beam failure recovery condition, an establishment of Frequency Range (FR) 1 and FR 2 carrier aggregation, or a scheduling of more uplink subframes than downlink subframes;
   performing the PRACH transmission according to a power level, wherein the power level is based on a first power reduction value associated with a power management maximum power reduction (P-MPR), wherein the first power reduction value is less than a second power reduction value of a power reduction applied to an uplink transmission other than the PRACH transmission, and wherein the uplink transmission other than the PRACH transmission comprises at least one of a physical uplink shared channel (PUSCH), physical uplink control channel (PUCCH), or sounding reference signal (SRS);
   reporting a power headroom report (PHR) indicating the second power reduction value to the uplink transmission using at least one of a delta_P value or a P-bit value.

2. The method of claim 1, wherein the first power reduction value is a zero value; and
   the power level of the PRACH transmission corresponds to a first maximum transmission power level for the UE.

3. The method of claim 1, wherein the first power reduction value is configured to cause the PRACH transmission to comply with at least one predefined electromagnetic power density exposure requirement.

4. The method of claim 1, wherein the power level of the PRACH transmission corresponds to a first maximum transmission power level minus the first power reduction value.

5. The method of claim 1, wherein the first power reduction value is configured to cause the PRACH transmission to meet a predefined total exposure ratio (TER) requirement associated with electromagnetic exposure from the UE.

6. The method of claim 1, wherein the first power reduction value for PRACH transmission is based on a coexistence of two radio access technologies (RATs) used by the UE.

7. A user equipment (UE) comprising:
   one or more processors;
   a memory storing instructions which, when executed by the one or more processors, cause the UE to:
   trigger a physical random access channel (PRACH) transmission based on at least one condition being met, wherein the at least one condition comprises at least one of: a beam failure recovery condition, an establishment of Frequency Range (FR) 1 and FR 2 carrier aggregation, or a scheduling of more uplink subframes than downlink subframes; and
   perform the PRACH transmission according to a power level, wherein the power level is based on a first power reduction value associated with a power management maximum power reduction (P-MPR), and wherein the first power reduction value is less than a second power reduction value of a power reduction applied to an uplink transmission other than the PRACH transmission;
   report a power headroom report (PHR) indicating the second power reduction value to the uplink transmission other than the PRACH transmission using at least one of a delta_P value or a P-bit value.

8. The UE of claim 7, wherein the first power reduction value is a zero value; and
   the power level of the PRACH transmission corresponds to a first maximum transmission power level for the UE.

9. The UE of claim 7, wherein the first power reduction value is configured to cause the PRACH transmission to comply with at least one predefined electromagnetic power density exposure requirement.

10. The UE of claim 7, wherein the power level of the PRACH transmission corresponds to a first maximum transmission power level minus the first power reduction value.

11. The UE of claim 7, wherein the first power reduction value is configured to cause the PRACH transmission to meet a predefined total exposure ratio (TER) requirement associated with electromagnetic exposure from the UE.

12. The UE of claim 7, wherein the first power reduction value for PRACH transmission is based on a coexistence of two radio access technologies (RATs) used by the UE.

13. A non-transitory computer-readable storage medium comprising instructions which, when executed by processing circuitry, cause the processing circuitry to perform a method, the method comprising:
- triggering a physical random access channel (PRACH) transmission based on at least one condition being met, wherein the at least one condition comprises at least one of: a beam failure recovery condition, an establishment of Frequency Range (FR) 1 and FR 2 carrier aggregation, or a scheduling of more uplink subframes than downlink subframes; and
- performing the PRACH transmission according to a power level, wherein the power level is based on a first power reduction value associated with a power management maximum power reduction (P-MPR), and wherein the first power reduction value is less than a second power reduction value of a power reduction applied to an uplink transmission other than the PRACH transmission;
- reporting a power headroom report (PHR) indicating the second power reduction value to the uplink transmission using at least one of a delta P value or a P-bit value.

14. The non-transitory computer-readable storage medium of claim 13, wherein the first power reduction value is a zero value, and wherein the power level of the PRACH transmission corresponds to a first maximum transmission power level for a user equipment (UE).

15. The non-transitory computer-readable storage medium of claim 13, wherein the first power reduction value is configured to cause the PRACH transmission to comply with at least one predefined electromagnetic power density exposure requirement.

16. The non-transitory computer-readable storage medium of claim 13, wherein the power level of the PRACH transmission corresponds to a first maximum transmission power level minus the first power reduction value.

17. The non-transitory computer-readable storage medium of claim 13, wherein the first power reduction value is configured to cause the PRACH transmission to meet a predefined total exposure ratio (TER) requirement associated with electromagnetic exposure from a user equipment (UE).

18. The non-transitory computer-readable storage medium of claim 13, wherein the first power reduction value for PRACH transmission is based on a coexistence of two radio access technologies (RATs) used by a user equipment (UE).

* * * * *